United States Patent
Ray et al.

(10) Patent No.: US 10,762,209 B2
(45) Date of Patent: Sep. 1, 2020

(54) BOOT SECURITY

(71) Applicant: Sophos Limited, Abingdon, Oxfordshire (GB)

(72) Inventors: Kenneth D. Ray, Seattle, WA (US); Simon Neil Reed, Wokingham (GB); Daniel Salvatore Schiappa, Bedford, NH (US)

(73) Assignee: Sophos Limited, Abingdon (GB)

( * ) Notice: Subject to any disclaimer, the term of this patent is extended or adjusted under 35 U.S.C. 154(b) by 47 days.

(21) Appl. No.: 15/150,707

(22) Filed: May 10, 2016

(65) Prior Publication Data
US 2017/0308706 A1    Oct. 26, 2017

Related U.S. Application Data

(63) Continuation of application No. 15/133,223, filed on Apr. 20, 2016.

(51) Int. Cl.
*G06F 21/57* (2013.01)
*G06F 9/4401* (2018.01)
*H04L 29/06* (2006.01)

(52) U.S. Cl.
CPC .......... *G06F 21/575* (2013.01); *G06F 9/4401* (2013.01); *G06F 9/4416* (2013.01);
(Continued)

(58) Field of Classification Search
CPC ................................ G06F 21/57; G06F 9/4401
See application file for complete search history.

(56) References Cited

U.S. PATENT DOCUMENTS 5,872,917 A * 2/1999 Hellman ................. G06F 21/31
  709/229
6,185,678 B1 * 2/2001 Arbaugh ............... G06F 21/575
  713/2

(Continued)

FOREIGN PATENT DOCUMENTS

WO    WO-2012148255    11/2012

OTHER PUBLICATIONS

Trusted Computing Group, "Attestation Identity Key (AIK) Certificate Enrollment Specification Frequently Asked Questions", https://trustedcomputinggroup.org/wp-content/uploads/IWG-AIK-CMC-enrollment-FAQ.pdf, Sep. 2011, 2 Pages.

(Continued)

*Primary Examiner* — Jason Chiang
(74) *Attorney, Agent, or Firm* — Strategic Patents, P.C.

(57) ABSTRACT

In one aspect, a method for securing a device includes receiving a first set of boot information of a device, receiving a first cryptographic proof of the first set of boot information, receiving a second set of boot information of the device, receiving a second cryptographic proof of the second set of boot information, comparing the first set of boot information and the second set of boot information, and, upon determining that the first set of boot information and the second set of boot information are different, determining whether differences between the first set of boot information and the second set of boot information are permitted. The method may also include generating an alert upon determining that differences between the first set of boot information and the second set of boot information are not permitted.

19 Claims, 8 Drawing Sheets

(52) U.S. Cl.
CPC .......... *G06F 21/57* (2013.01); *H04L 63/0869* (2013.01); *H04L 63/123* (2013.01); *H04L 63/1441* (2013.01); *H04L 63/12* (2013.01); *H04L 63/145* (2013.01)

(56) References Cited

U.S. PATENT DOCUMENTS

| | | | |
|---|---|---|---|
| 7,512,815 | B1 | 3/2009 | Munetoh et al. |
| 7,552,419 | B2 | 6/2009 | Zimmer et al. |
| 8,074,262 | B2 | 12/2011 | Scarlata et al. |
| 8,176,336 | B1* | 5/2012 | Mao ........................ H04L 9/006 713/189 |
| 8,201,239 | B2 | 6/2012 | Smith et al. |
| 8,249,257 | B2 | 8/2012 | Brutch et al. |
| 8,433,924 | B2 | 4/2013 | Challener et al. |
| 8,549,288 | B2 | 10/2013 | Bade et al. |
| 8,671,449 | B1 | 3/2014 | Nachenberg |
| 8,869,264 | B2 | 10/2014 | MacKintosh et al. |
| 8,909,940 | B2 | 12/2014 | Peszek et al. |
| 9,053,059 | B2 | 6/2015 | Scott-Nash et al. |
| 9,195,831 | B1* | 11/2015 | Condra ............... G06F 11/1417 |
| 9,197,654 | B2 | 11/2015 | Ben-Shalom et al. |
| 9,436,827 | B2 | 9/2016 | Mackintosh et al. |
| 9,465,958 | B2 | 10/2016 | Gardner et al. |
| 9,465,959 | B2 | 10/2016 | Gardner et al. |
| 9,547,780 | B2 | 1/2017 | Gardner et al. |
| 9,673,982 | B2 | 6/2017 | Marquardt et al. |
| 9,674,182 | B2 | 6/2017 | Smith et al. |
| 9,678,895 | B2 | 6/2017 | Scott-Nash et al. |
| 9,721,103 | B2 | 8/2017 | Sherwood et al. |
| 9,819,496 | B2 | 11/2017 | Li et al. |
| 9,864,856 | B2 | 1/2018 | Marquardt et al. |
| 2005/0120219 | A1 | 6/2005 | Munetoh ............... G06F 21/52 713/176 |
| 2006/0005009 | A1* | 1/2006 | Ball ........................ G06F 21/57 713/155 |
| 2006/0075223 | A1* | 4/2006 | Bade ........................ G06F 21/57 713/162 |
| 2006/0155988 | A1* | 7/2006 | Hunter ................... G06F 21/575 713/164 |
| 2008/0046898 | A1* | 2/2008 | Molina ................... G06F 21/72 719/330 |
| 2008/0163383 | A1* | 7/2008 | Kumar ................... G06F 21/575 726/29 |
| 2008/0178257 | A1* | 7/2008 | Mishina ................. H04L 9/088 726/2 |
| 2009/0063108 | A1* | 3/2009 | De Atley ............... G06F 21/575 703/2 |
| 2009/0086979 | A1* | 4/2009 | Brutch ................... H04L 9/0836 380/279 |
| 2010/0235912 | A1* | 9/2010 | Hermann ................ G06F 21/57 726/23 |
| 2011/0066838 | A1* | 3/2011 | Takayama ............. G06F 21/575 713/2 |
| 2012/0011352 | A1 | 1/2012 | Shimatani et al. |
| 2012/0011353 | A1* | 1/2012 | Hayashida ............. G06F 21/57 713/1 |
| 2012/0198514 | A1* | 8/2012 | McCune ................ G06F 21/57 726/1 |
| 2013/0212369 | A1 | 8/2013 | Imtiaz et al. |
| 2014/0025939 | A1 | 1/2014 | Smith et al. |
| 2014/0033210 | A1 | 1/2014 | Haikney et al. |
| 2014/0095886 | A1* | 4/2014 | Futral ..................... G06F 21/72 713/187 |
| 2014/0108652 | A1* | 4/2014 | Richard ............... G06F 11/3003 709/224 |
| 2014/0115659 | A1* | 4/2014 | Attfield ................... G06F 21/51 726/1 |
| 2014/0143538 | A1* | 5/2014 | Lindteigen .......... H04L 63/1441 713/156 |
| 2014/0215202 | A1* | 7/2014 | Paris ..................... G06F 21/572 713/100 |
| 2015/0113618 | A1 | 4/2015 | Sinha et al. |
| 2015/0227744 | A1* | 8/2015 | Horovitz ................. G06F 21/57 726/22 |
| 2016/0014159 | A1* | 1/2016 | Schrecker ........... H04L 63/0869 726/1 |
| 2016/0099969 | A1* | 4/2016 | Angus ................. H04L 63/0876 713/158 |
| 2016/0112203 | A1* | 4/2016 | Thom ..................... H04L 9/3247 713/176 |
| 2016/0350534 | A1* | 12/2016 | Poornachandran ..... G06F 21/57 |
| 2016/0379000 | A1* | 12/2016 | Carpenter ............. G06F 21/552 726/17 |
| 2017/0300309 | A1* | 10/2017 | Berger ..................... G06F 8/60 |
| 2017/0308704 | A1 | 10/2017 | Ray et al. |
| 2018/0321947 | A1* | 11/2018 | Liu ........................ G06F 9/4401 |

OTHER PUBLICATIONS

Spiger, Rob et al., "Building hardware-based security with a Trusted Platform Module (TPM)", https://channel9.msdn.com/Events/BUILD/BUILD2011/HW-462T Sep. 2011, 30 Pages.

Segall, Ariel, "Using the TPM: Machine Authentication and Attestation", http://opensecuritytraining.info/IntroToTrustedComputing_files/Day2-1-auth-and-att.pdf, Oct. 2012, 46 Pages.

Griffin, Dan, "Hacking Measured Boot and UEFI", https://www.defcon.org/images/defcon-20/dc-20-presentations/Griffin/DEFCON-20-Griffin-Hacking-Measured-Boot-and-UEFI.pdf, Jul. 2012, 40 Pages.

Trusted Computing Group, "Glossary", http://www.trustedcomputing-group.org/developers/glossary, Dec. 2012, 7 Pages.

Trusted Computing Group, "Endorsement Key (EK) and Platform Certificate Enrollment Specification Frequently Asked Questions", https://trustedcomputinggroup.org/wp-content/uploads/IWG-EK-CMC-enrollment-for-TPM-v1-2-FAQ-rev-April-3-2013.pdf, Apr. 2013, 2 Pages.

"Secure the Windows 8.1 boot process", https://technet.microsoft.com/en-us/windows/dn168167.aspx, Apr. 2013, 4 Pages.

Cervesato, Iliano, "Trusted Computing Technology and Client-Side Access Control Architecture", https://web2.qatar.cmu.edu/iliano/courses/06S-GMU-ISA767/slides/6/w9-tc.pdf, 2006, 9 Pages.

Juniper, "What's the Difference between Secure Boot and Measured Boot?", https://forums.juniper.net/t5/Security-Now/What-s-the-Difference-between-Secure-Boot-and-Measured-Boot/ba-p/281251, Sep. 17, 2015, 10 Pages.

Trusted Computing Group, "TCG Infrastructure Working Group a CMC Profile for AIK Certificate Enrollment", https://trustedcomputinggroup.org/tcg-infrastructure-working-group-cmc-profile-aik-certificate-enrollment/ Sep. 1, 2011, 3 Pages.

Trusted Computing Group, "TCG Infrastructure WG TPM Keys for Platform Identity for TPM 1.2", http://www.trustedcomputinggroup.org/resources/tpm_keys_for_platform_identity_for_tpm_12, Aug. 21, 2015, 68 Pages.

Trusted Computing Group, "TCG Infrastructure Workgroup Subject Key Attestation Evidence Extension", http://www.trustedcomputing-group.org/resources/infrastructure_work_group_subject_key_attestation_evidence_extension_version_10, Jun. 16, 2005, 19 Pages.

Trusted Computing Group, "Trusted Platform Module", https://trustedcomputinggroup.org/trusted-platform-module-tpm-summary/ Jan. 4, 2018, 5 pages.

USPTO, "U.S. Appl. No. 15/133,223 Non-Final Office Action dated Dec. 28, 2017", 23 pages.

IPO, "U.K. Application No. 1610614.8 Search Report dated Nov. 28, 2016", 4 pages.

USPTO, "U.S. Appl. No. 15/133,223 Final Office Action dated Aug. 8, 2018", 28 pages.

Tan, Hailun et al., "A TPM-enabled Remote Attestation Protocol (TRAP) in Wireless Sensor Networks", Proceedings of the 6th ACM Workshop on Performance Monitoring and Measurement of Heterogeneous Wireless and Wired Networks, Oct. 31-31, 2011, pp. 9-16, Miami, Florida, USA.

USPTO, "U.S. Appl. No. 15/133,223 Non-Final Office Action dated Dec. 13, 2018", 23 pages.

(56) References Cited

OTHER PUBLICATIONS

USPTO, "U.S. Appl. No. 15/133,223 Notice of Allowance dated Aug. 19, 2019", 18 pages.

\* cited by examiner

FIG. 8

Set of Boot Information - 801

List of Boot Items 802          proof 803

...                             ...
811 \Boot\winmgr.exe            <hash1>
812 \Boot\winload.exe           <hash2>
813 \Boot\drivers\MT0.dll.mui   <hash3>
814 \Boot\msrpc.sys             <hash4>
815 \Boot\vdrvroot.sys          <hash5>
...                             ...

ROM Entries - 820

821 BIOS Component              <hash6>
822 BIOS Component              <hash7>
...                             ...
823 Option ROM:                 <hash8>
824 Option ROM:                 <hash9>
...                             ...
825 Motherboard ROM:            <hash10>
826 Motherboard ROM:            <hash11>
...                             ...

Hinting Information - 831

...
832  <hardware manufacturer>
833  <hardware release date>
834  <hardware version>
835  <operating system>
836  <OS release date>
837  <OS version>
...

Attestation - 840

841 Device ID:          <ID>
842 PCR Register 1:     <register value>
843 PCR Register 2:     <register value>

844 Signature:          <signature>

US 10,762,209 B2

BOOT SECURITY

RELATED APPLICATIONS

This application is a continuation of U.S. patent application Ser. No. 15/133,223 filed Apr. 20, 2016, the entire content of which is hereby incorporated by reference.

TECHNICAL FIELD

This application relates to computer security, and more particularly to techniques for securing boot activity in computing environments.

BACKGROUND

As malware and attackers become more sophisticated, it has become increasingly difficult to secure devices from attacks that attempt to subvert security protections, for example, by inserting malware into boot process activity that takes place when device operation is initiated and before an operating system or virtualization system is running. The Trusted Computing Group develops standards supportive of a hardware-based root of trust. Even so, current technology implementations leave opportunities for attackers to compromise systems and subvert the boot processes of devices.

SUMMARY

In general, in an aspect, a system for securing a device includes a processor, and a non-transitory computer readable medium including instructions, the instructions when executed on the processor cause the processor to perform steps including receive a first request from a device, and in response to the first request, send a first challenge to the device. The instructions when executed further cause the processor to, in response to the challenge, receive from the device a first set of boot information and a first cryptographic proof of the first challenge and the first set of boot information generated by a trusted component of the device, verify the first cryptographic proof of the first challenge and the first set of boot information, and store the first set of boot information. The instructions when executed further cause the processor to, receive a second request from the device, send a second challenge to the device, and in response to the challenge, receive from the device a second set of boot information and a second cryptographic proof of the second challenge and the second set of boot information generated by the trusted component of the device. The instructions when executed further cause the processor to verify the second cryptographic proof of the second challenge and the second set of boot information, compare the first set of boot information and the second set of boot information; and upon determining that the first set of boot information and the second set of boot information are different, determine whether differences between the first set of boot information and the second set of boot information are permitted, and generate an alert upon determining that differences between the first set of boot information and the second set of boot information are not permitted.

In general, in an aspect, a method for securing a device includes receiving a first set of boot information of a device, receiving a first cryptographic proof of the first set of boot information, receiving a second set of boot information of the device, receiving a second cryptographic proof of the second set of boot information, comparing the first set of boot information and the second set of boot information, and upon determining that the first set of boot information and the second set of boot information are different, determining whether differences between the first set of boot information and the second set of boot information are permitted, and generating an alert upon determining that differences between the first set of boot information and the second set of boot information are not permitted.

In some implementations, determining whether differences between the first set of boot information and the second set of boot information are permitted further includes comparing first boot items identified in the first set of boot information with second boot items identified in the second set of boot information. In some implementations, determining whether differences between the first set of boot information and the second set of boot information are permitted includes determining whether a number of differences is consistent with a permitted update to the device. In some implementations, the first set of boot information further includes cryptographic proofs of each boot item identified in the boot information. In some implementations, the first set of boot information and the second set of boot information each include one or more PCR values.

In some implementations, the first set of boot information and the second set of boot information each include a device identifier. In some implementations, the first set of boot information and the second set of boot information each include device platform information, such as hardware information, software information, and configuration information. In some implementations, the first set of boot information includes information about boot items and configuration values.

In some implementations, determining whether differences between the first set of boot information and the second set of boot information are permitted includes comparing versions of changed boot items. In some implementations, determining whether differences between the first set of boot information and the second set of boot information are permitted includes determining a type of boot item that changed. In some implementations, the first cryptographic proof and the second cryptographic proof are generated by a trusted component of the device. In some implementations, the trusted component includes one or more platform configuration registers, one or more attestation identity keys, and a cryptographic processor.

In general, in an aspect, a computer program product is embodied in a non-transitory computer readable medium. When executed on a server, such as a threat management facility, the computer program product performs operations, that include receive a first set of boot information from a device, receive a first cryptographic proof of the first set of boot information, receive a second set of boot information from the device, receive a second cryptographic proof of the second set of boot information, compare the first set of boot information and the second set of boot information, and upon determining that the first set of boot information and the second set of boot information are different, determine whether differences between the first set of boot information and the second set of boot information are permitted, and generate an alert upon determining that differences between the first set of boot information and the second set of boot information are not permitted.

In some implementations, the first set of boot information further includes cryptographic proofs of each boot item identified in the boot information. In some implementations, the first set of boot information and the second set of boot information each include one or more PCR values. In some implementations, the first set of boot information and the second set of boot information each include a device identifier.

In some implementations, the first set of boot information and the second set of boot information each include device platform information. In some implementations, the first set of boot information includes information about boot items and configuration values. In some implementations, determining whether differences between the first set of boot information and the second set of boot information are permitted includes comparing versions of changed boot items. In some implementations, determining whether differences between the first set of boot information and the second set of boot information are permitted includes determining a type of boot item that changed.

In general, in an aspect, a system for protecting a device includes a processor and a non-transitory computer readable medium comprising instructions that when executed on the processor cause the processor to perform steps including sending a request to a first device, receiving first device information from the first device, the device information comprising operating context information, receiving a first set of boot information from the first device including a list of boot items, receiving a first attestation vector from the first device, the first attestation vector comprising one or more PCR values and a digital signature on at least one of the one or more PCR values, verifying the first set of boot information based on the first attestation vector, determining a reputation for each of the boot items in the list of boot items, and generating an alert based on the determined reputation.

In general, in an aspect, a method for securing a device includes receiving a first set of boot information from a first device, the first set of boot information comprising a first list of boot items, receiving from the first device a first proof based on the first set of boot information, verifying the first set of boot information based on the first proof, determining a reputation for one or more of the boot items in the first list of boot items, and reporting the determined reputation.

In some implementations, the method includes receiving a request from the first device and in response to the request sending a challenge to the first device. In some implementations, the first set of boot information includes a proof calculated on each boot item in the first list of boot items. In some implementations, the first set of boot information includes a device identifier. In some implementations, the first set of boot information includes a device platform information. In some implementations, reporting the determined reputation includes generating an alert upon determining that determined reputation meets a threshold for at least one of the one or more of the boot items in the first list of boot items.

In some implementations, reporting the determined reputation includes causing a message to be sent to an administrator. In some implementations, reporting the determined reputation includes causing an alert to be displayed on a control panel. In some implementations, the reputation for the one or more of the boot items is based on a determined version.

In some implementations, the reputation for one or more of the boot items is based on timing of appearance of the one or more of the boot items on multiple devices. In some implementations, timing of appearance of the one or more of the boot items on multiple devices is consistent with an update. In some implementations, timing of appearance of the one or more of the boot items on multiple devices is consistent with malware.

In general, in an aspect, a computer program product is embodied in a non-transitory computer readable medium. When executed on a device, such as a threat management facility, the computer program product performs steps comprising receive a first set of boot information from a first device, the first set of boot information comprising a first list of boot items, receive from the first device a first proof based on the first set of boot information, verify the first set of boot information based on the first proof, determine a reputation for one or more of the boot items in the first list of boot items, and report the determined reputation.

In some implementations, the first set of boot information includes a device identifier. In some implementations, the first set of boot information includes device platform information. In some implementations, reporting the determined reputation includes generating an alert upon determining that determined reputation meets a threshold for at least one of the one or more of the boot items in the first list of boot items.

In some implementations, reporting the determined reputation includes causing a message to be sent to an administrator. In some implementations, reporting the determined reputation includes causing an alert to be displayed on a control panel. In some implementations, the reputation for one or more of the boot items is based on timing of appearance of the one or more of the boot items on multiple devices.

In general, in an aspect, a processor on a device may transmit request information to a secure component. The secure component may receive the request information, process the request information, and in response provide a cryptographic proof associated with all or a portion of the request information to the device processor. In some implementations, the proof may be based on all or a portion of the request information. In some implementations, the proof may be based on other information provided by the device. In some implementations, the proof may be based on other information available to the secure component. The device may send the request to a verifier (e.g., verification service). In response to the request, the device may receive a challenge.

In some implementations, the processor on the device may transmit the challenge to the secure component. The processor on the device may provide boot information to the secure component. In response, the secure component may generate a proof based on all or a portion of the boot information and the challenge. The secure component may send the proof to the processor of the device. The device may transmit all or a portion of the boot information, the challenge, and the proof to the server. In response, the device may receive an acknowledgement. In response, the device may receive an alert message.

In some implementations, other information may be included in the proof. In some implementations, other information may be included in the information provided to the secure component. In some implementations, other information may be available to the secure component.

In some implementations a challenge is not requested from a server. In some implementations, a challenge is generated by the device. In some implementations, a challenge is generated based on a date/time. In some implementations, a challenge is generated by the device based on other information.

In some implementations, the boot information is collected by the secure component during the boot of the device. In some implementations, the boot information is collected by the processor during the boot of the device. In some implementations all or a portion of the proof is generated during initial operations, as a list of boot items and associated proofs are generated.

BRIEF DESCRIPTION OF THE FIGURES

The foregoing and other objects, features and advantages of the devices, systems, and methods described herein will be apparent from the following description of particular embodiments thereof, as illustrated in the accompanying drawings. The drawings are not necessarily to scale, emphasis instead being placed upon illustrating the principles of the devices, systems, and methods described herein.

FIG. 8 illustrates a set of boot information according to an implementation.

DETAILED DESCRIPTION

Embodiments will now be described with reference to the accompanying figures, in which preferred embodiments are shown. The foregoing may, however, be embodied in many different forms and should not be construed as limited to the illustrated embodiments set forth herein.

All documents mentioned herein are hereby incorporated by reference in their entirety. References to items in the singular should be understood to include items in the plural, and vice versa, unless explicitly stated otherwise or clear from the context. Grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth.

Recitation of ranges of values herein are not intended to be limiting, referring instead individually to any and all values falling within the range, unless otherwise indicated herein, and each separate value within such a range is incorporated into the specification as if it were individually recited herein. The words "about," "approximately," or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the described embodiments. The use of any and all examples, or exemplary language ("e.g.," "such as," or the like) provided herein, is intended merely to better illuminate the embodiments and does not pose a limitation on the scope of the embodiments or the claims. No language in the specification should be construed as indicating any unclaimed element as essential to the practice of the embodiments.

In the following description, it is understood that terms such as "first," "second," "third," "above," "below," and the like, are words of convenience and are not to be construed as limiting terms unless expressly state otherwise.

Figure 1:
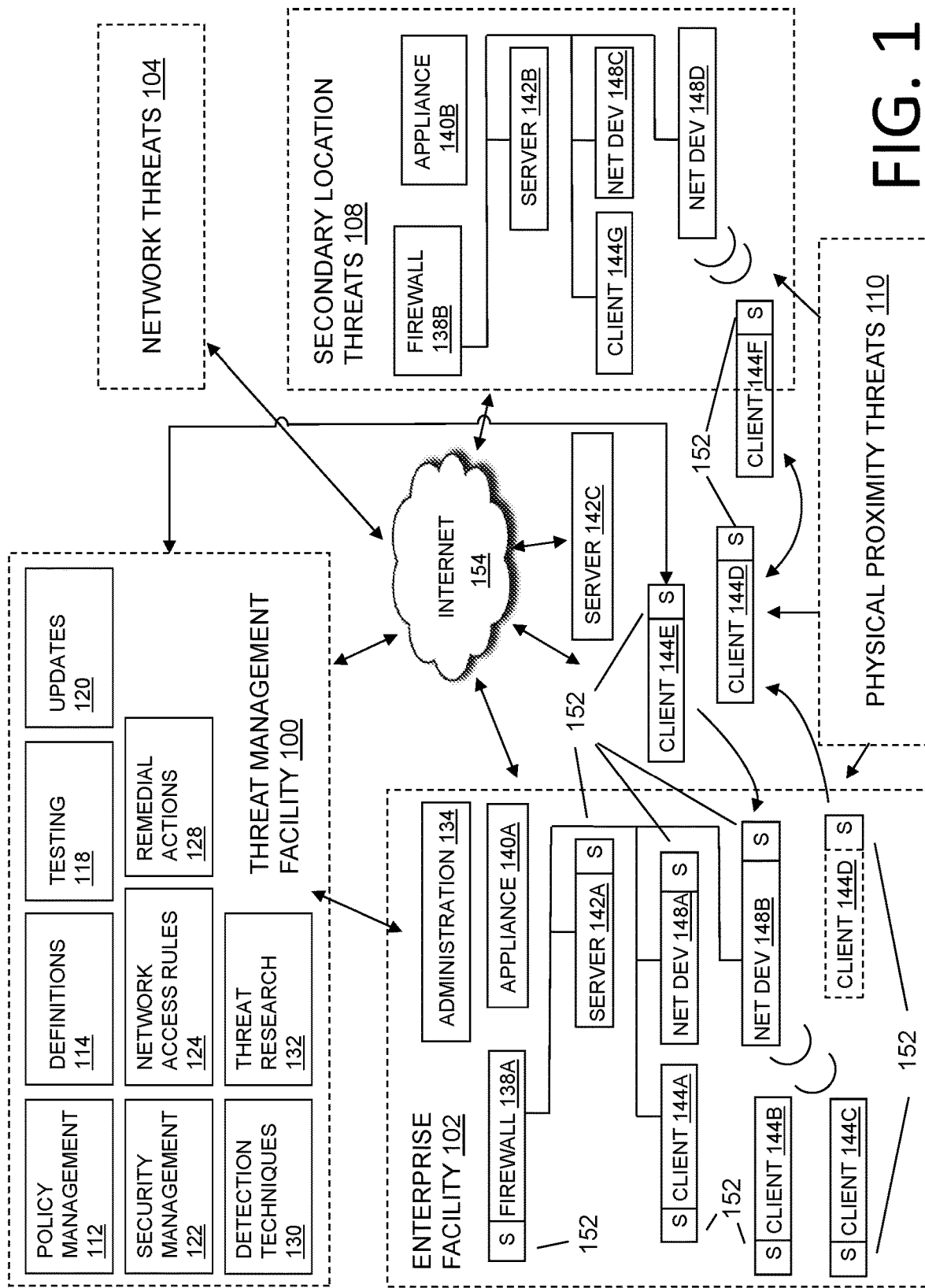
FIG. 1 illustrates an environment for threat management.

FIG. 1 illustrates an environment for threat management. Specifically, FIG. 1 depicts a block diagram of a threat management system providing protection to an enterprise against a plurality of threats—a context in which the following techniques may usefully be deployed. One aspect relates to corporate policy management and implementation through a threat management facility 100. As will be explained in more detail below, a threat management facility 100 may be used to protect computer assets from many threats, both computer-generated threats and user-generated threats. The threat management facility 100 may be multi-dimensional in that it may be designed to protect corporate assets from a variety of threats and it may be adapted to learn about threats in one dimension (e.g. worm detection) and apply the knowledge in another dimension (e.g. spam detection). Policy management is one of the dimensions for which the threat management facility can provide a control capability. A corporation or other entity may institute a policy that prevents certain people (e.g. employees, groups of employees, types of employees, guest of the corporation, etc.) from accessing certain types of computer programs. For example, the corporation may elect to prevent its accounting department from using a particular version of an instant messaging service or all such services. In this example, the policy management facility 112 may be used to update the policies of all corporate computing assets with a proper policy control facility or it may update a select few. By using the threat management facility 100 to facilitate the setting, updating and control of such policies the corporation only needs to be concerned with keeping the threat management facility 100 up to date on such policies. The threat management facility 100 may take care of updating all of the other corporate computing assets.

It should be understood that the threat management facility 100 may provide multiple services, and policy management may be offered as one of the services. We will now turn to a description of certain capabilities and components of the threat management facility 100.

Over recent years, malware has become a major problem across the Internet 154. From both a technical perspective and a user perspective, the categorization of a specific threat type, whether as virus, worm, spam, phishing exploration, spyware, adware, or the like, is becoming reduced in significance. The threat, no matter how it is categorized, may need to be stopped at various points of a networked computing environment, such as one of an enterprise facility 102, including at one or more laptops, desktops, servers, gateways, communication ports, handheld or mobile devices, firewalls, and the like. Similarly, there may be less and less benefit to the user in having different solutions for known and unknown threats. As such, a consolidated threat management facility 100 may need to apply a similar set of technologies and capabilities for all threats. In certain embodiments, the threat management facility 100 may provide a single agent on the desktop, and a single scan of any suspect file. This approach may eliminate the inevitable overlaps and gaps in protection caused by treating viruses and spyware as separate problems, while simultaneously simplifying administration and minimizing desktop load. As the number and range of types of threats has increased, so may have the level of connectivity available to all IT users. This may have led to a rapid increase in the speed at which threats may move. Today, an unprotected PC connected to the Internet 154 may be infected quickly (perhaps within 10 minutes) which may require acceleration for the delivery of threat protection. Where once monthly updates may have been sufficient, the threat management facility 100 may automatically and seamlessly update its product set against spam and virus threats quickly, for instance, every five minutes, every minute, continuously, or the like. Analysis and testing may be increasingly automated, and also may be performed more frequently; for instance, it may be completed in 15 minutes, and may do so without compromising quality. The threat management facility 100 may also extend techniques that may have been developed for virus and malware protection, and provide them to enterprise facility 102 network administrators to better control their environments. In addition to stopping malicious code, the threat management facility 100 may provide policy management that may be able to control legitimate applications, such as VoIP, instant messaging, peer-to-peer file-sharing, and the like, that may undermine productivity and network performance within the enterprise facility 102.

The threat management facility 100 may provide an enterprise facility 102 protection from computer-based malware, including viruses, spyware, adware, Trojans, intrusion, spam, policy abuse, uncontrolled access, and the like, where the enterprise facility 102 may be any entity with a networked computer-based infrastructure. In an embodiment, FIG. 1 may depict a block diagram of the threat management facility 100 providing protection to an enterprise against a plurality of threats. The enterprise facility 102 may be corporate, commercial, educational, governmental, or the like, and the enterprise facility's 102 computer network may be distributed amongst a plurality of facilities, and in a plurality of geographical locations, and may include administration 134, a firewall 138A, an appliance 140A, server 142A, network devices 148A-B, clients 144A-D, such as protected by computer security facilities 152, and the like. It will be understood that any reference herein to client facilities may include the clients 144A-D shown in FIG. 1 and vice-versa. The threat management facility 100 may include a plurality of functions, such as security management facility 122, policy management facility 112, update facility 120, definitions facility 114, network access rules facility 124, remedial action facility 128, detection techniques facility 130, testing facility 118, threat research facility 132, and the like. In embodiments, the threat protection provided by the threat management facility 100 may extend beyond the network boundaries of the enterprise facility 102 to include clients 144D (or client facilities) that have moved into network connectivity not directly associated or controlled by the enterprise facility 102. Threats to client facilities may come from a plurality of sources, such as from network threats 104, physical proximity threats 110, secondary location threats 108, and the like. Clients 144A-D may be protected from threats even when the client 144A-D is not located in association with the enterprise 102, such as when a client 144E-F moves in and out of the enterprise facility 102, for example when interfacing with an unprotected server 142C through the Internet 154, when a client 144F is moving into a secondary location threat 108 such as interfacing with components 140B, 142B, 148C, 148D that are not protected, and the like. In embodiments, the threat management facility 100 may provide an enterprise facility 102 protection from a plurality of threats to multiplatform computer resources in a plurality of locations and network configurations, with an integrated system approach.

In embodiments, the threat management facility 100 may be provided as a stand-alone solution. In other embodiments, the threat management facility 100 may be integrated into a third-party product. An application programming interface (e.g. a source code interface) may be provided such that the threat management facility 100 may be integrated. For instance, the threat management facility 100 may be stand-alone in that it provides direct threat protection to an enterprise or computer resource, where protection is subscribed to directly 100. Alternatively, the threat management facility 100 may offer protection indirectly, through a third-party product, where an enterprise may subscribe to services through the third-party product, and threat protection to the enterprise may be provided by the threat management facility 100 through the third-party product.

The security management facility 122 may include a plurality of elements that provide protection from malware to enterprise facility 102 computer resources, including endpoint security and control, email security and control, web security and control, reputation-based filtering, control of unauthorized users, control of guest and non-compliant computers, and the like. The security management facility 122 may be a software application that may provide malicious code and malicious application protection to a client facility computing resource. The security management facility 122 may have the ability to scan the client facility files for malicious code, remove or quarantine certain applications and files, prevent certain actions, perform remedial actions and perform other security measures. In embodiments, scanning the client facility may include scanning some or all of the files stored to the client facility on a periodic basis, scanning an application when the application is executed, scanning files as the files are transmitted to or from the client facility, or the like. The scanning of the applications and files may be performed to detect known malicious code or known unwanted applications. In an embodiment, new malicious code and unwanted applications may be continually developed and distributed, and updates to the known code database may be provided on a periodic basis, on a demand basis, on an alert basis, or the like.

The security management facility 122 may provide email security and control, where security management may help to eliminate spam, viruses, spyware and phishing, control of email content, and the like. The security management facility's 122 email security and control may protect against inbound and outbound threats, protect email infrastructure, prevent data leakage, provide spam filtering, and the like. In an embodiment, security management facility 122 may provide for web security and control, where security management may help to detect or block viruses, spyware, malware, unwanted applications, help control web browsing, and the like, which may provide comprehensive web access control enabling safe, productive web browsing. Web security and control may provide Internet use policies, reporting on suspect devices, security and content filtering, active monitoring of network traffic, URI filtering, and the like. In an embodiment, the security management facility 122 may provide for network access control, which may provide control over network connections. Network control may stop unauthorized, guest, or non-compliant systems from accessing networks, and may control network traffic that may not be bypassed from the client level. In addition, network access control may control access to virtual private networks (VPN), where VPNs may be a communications network tunneled through another network, establishing a logical connection acting as a virtual network. In embodiments, a VPN may be treated in the same manner as a physical network.

The security management facility 122 may provide host intrusion prevention through behavioral based protection, which may guard against unknown threats by analyzing behavior before software code executes. Behavioral based protection may monitor code when it runs and intervene if the code is deemed to be suspicious or malicious. Advantages of behavioral based protection over runtime protection may include code being prevented from running. Whereas runtime protection may only interrupt code that has already partly executed, behavioral protection can identify malicious code at the gateway or on the file servers and delete the code before it can reach endpoint computers and the like.

The security management facility 122 may provide reputation filtering, which may target or identify sources of known malware. For instance, reputation filtering may include lists of URIs of known sources of malware or known suspicious IP addresses, or domains, say for spam, that when detected may invoke an action by the threat management facility 100, such as dropping them immediately. By dropping the source before any interaction can initiate, potential threat sources may be thwarted before any exchange of data can be made.

In embodiments, information may be sent from the enterprise back to a third party, a vendor, or the like, which may lead to improved performance of the threat management facility 100. For example, the types, times, and number of virus interactions that a client experiences may provide useful information for the preventions of future virus threats. This type of feedback may be useful for any aspect of threat detection. Feedback of information may also be associated with behaviors of individuals within the enterprise, such as being associated with most common violations of policy, network access, unauthorized application loading, unauthorized external device use, and the like. In embodiments, this type of information feedback may enable the evaluation or profiling of client actions that are violations of policy that may provide a predictive model for the improvement of enterprise policies.

The security management facility 122 may support overall security of the enterprise facility 102 network or set of enterprise facility 102 networks, e.g., by providing updates of malicious code information to the enterprise facility 102 network and associated client facilities. The updates may include a planned update, an update in reaction to a threat notice, an update in reaction to a request for an update, an update based on a search of known malicious code information, or the like. The administration facility 134 may provide control over the security management facility 122 when updates are performed. The updates may be automatically transmitted without an administration facility's 134 direct control, manually transmitted by the administration facility 134, or otherwise distributed. The security management facility 122 may manage the receipt of malicious code descriptions from a provider, distribution of the malicious code descriptions to enterprise facility 102 networks, distribution of the malicious code descriptions to client facilities, and so forth.

The threat management facility 100 may provide a policy management facility 112 that may be able to block non-malicious applications, such as VoIP, instant messaging, peer-to-peer file-sharing, and the like, that may undermine productivity and network performance within the enterprise facility 102. The policy management facility 112 may be a set of rules or policies that may indicate enterprise facility 102 access permissions for the client facility, such as access permissions associated with the network, applications, external computer devices, and the like. The policy management facility 112 may include a database, a text file, a combination of databases and text files, or the like. In an embodiment, a policy database may be a block list, a black list, an allowed list, a white list, or the like that may provide a list of enterprise facility 102 external network locations/applications that may or may not be accessed by the client facility. The policy management facility 112 may include rules that may be interpreted with respect to an enterprise facility 102 network access request to determine if the request should be allowed. The rules may provide a generic rule for the type of access that may be granted. The rules may be related to the policies of an enterprise facility 102 for access rights for the enterprise facility's 102 client facility. For example, there may be a rule that does not permit access to sporting websites. When a website is requested by the client facility, a security facility may access the rules within a policy facility to determine if the requested access is related to a sporting website. In an embodiment, the security facility may analyze the requested website to determine if the website matches with any of the policy facility rules.

The policy management facility 112 may be similar to the security management facility 122 but with the addition of enterprise facility 102 wide access rules and policies that may be distributed to maintain control of client facility access to enterprise facility 102 network resources. The policies may be defined for application type, subset of application capabilities, organization hierarchy, computer facility type, user type, network location, time of day, connection type, or the like. Policies may be maintained by the administration facility 134, through the threat management facility 100, in association with a third party, or the like. For example, a policy may restrict IM activity to only support personnel for communicating with customers. This may allow communication for departments requiring access, but may maintain the network bandwidth for other activities by restricting the use of IM to only the personnel that need access to instant messaging (IM) in support of the enterprise facility 102. In an embodiment, the policy management facility 112 may be a stand-alone application, may be part of the network server facility 142, may be part of the enterprise facility 102 network, may be part of the client facility, or the like.

The threat management facility 100 may provide configuration management, which may be similar to policy management, but may specifically examine the configuration set of applications, operating systems, hardware, and the like, and manage changes to their configurations. Assessment of a configuration may be made against a standard configuration policy, detection of configuration changes, remediation of improper configuration, application of new configurations, and the like. An enterprise may keep a set of standard configuration rules and policies which may represent the desired state of the device. For example, a client firewall may be running and installed, but in the disabled state, where remediation may be to enable the firewall. In another example, the enterprise may set a rule that disallows the use of USB disks, and sends a configuration change to all clients, which turns off USB drive access via a registry.

The threat management facility 100 may also provide for the removal of applications that potentially interfere with the operation of the threat management facility 100, such as competitor products that may also be attempting similar threat management functions. The removal of such products may be initiated automatically whenever such products are detected. In the case where such applications are services are provided indirectly through a third-party product, the application may be suspended until action is taken to remove or disable the third-party product's protection facility.

Threat management against a quickly evolving malware environment may require timely updates, and thus an update management facility 120 may be provided by the threat management facility 100. In addition, a policy management facility 112 may also require update management (e.g., as provided by the update facility 120 herein described). The update management for the security facility 122 and policy management facility 112 may be provided directly by the threat management facility 100, such as by a hosted system or in conjunction with the administration facility 134. In embodiments, the threat management facility 100 may provide for patch management, where a patch may be an update to an operating system, an application, a system tool, or the like, where one of the reasons for the patch is to reduce vulnerability to threats.

The security facility 122 and policy management facility 112 may push information to the enterprise facility 102 network and/or client facility. The enterprise facility 102 network and/or client facility may also or instead pull information from the security facility 122 and policy management facility 112 network server facilities 142, or there may be a combination of pushing and pulling of information between the security facility 122 and the policy management facility 112 network servers 142, enterprise facility 102 network, and client facilities, or the like. For example, the enterprise facility 102 network and/or client facility may pull information from the security facility 122 and policy management facility 112 network server facility 142 may request the information using the security facility 122 and policy management facility 112 update module; the request may be based on a certain time period, by a certain time, by a date, on demand, or the like. In another example, the security facility 122 and policy management facility 112 network servers 142 may push the information to the enterprise facility's 102 network and/or client facility by providing notification that there are updates available for download and then transmitting the information. The combination of the security management 122 network server facility 142 and security update module may function substantially the same as the policy management facility 112 network server and policy update module by providing information to the enterprise facility 102 network and the client facility in a push or pull method. In an embodiment, the policy management facility 112 and the security facility 122 management update modules may work in concert to provide information to the enterprise facility's 102 network and/or client facility for control of application execution. In an embodiment, the policy update module and security update module may be combined into a single update module.

As threats are identified and characterized, the threat management facility 100 may create definition updates that may be used to allow the threat management facility 100 to detect and remediate the latest malicious software, unwanted applications, configuration and policy changes, and the like. The threat definition facility 114 may contain threat identification updates, also referred to as definition files. A definition file may be a virus identity file that may include definitions of known or potential malicious code. The virus identity (IDE) definition files may provide information that may identify malicious code within files, applications, or the like. The definition files may be accessed by security management facility 122 when scanning files or applications within the client facility for the determination of malicious code that may be within the file or application. The definition files may contain a number of commands, definitions, or instructions, to be parsed and acted upon, or the like. In embodiments, the client facility may be updated with new definition files periodically to provide the client facility with the most recent malicious code definitions; the updating may be performed on a set time period, may be updated on demand from the client facility, may be updated on demand from the network, may be updated on a received malicious code alert, or the like. In an embodiment, the client facility may request an update to the definition files from an update facility 120 within the network, may request updated definition files from a computing facility external to the network, updated definition files may be provided to the threat definitions facility 114 from within the network, definition files may be provided to the client facility from an external computing facility from an external network, or the like.

A definition management facility 114 may provide timely updates of definition files information to the network, client facilities, and the like. New and altered malicious code and malicious applications may be continually created and distributed to networks worldwide. The definition files that maintain the definitions of the malicious code and malicious application information for the protection of the networks and client facilities may need continual updating to provide continual defense of the network and client facility from the malicious code and malicious applications. The definition files management may provide for automatic and manual methods of updating the definition files. In embodiments, the network may receive definition files and distribute the definition files to the network client facilities, the client facilities may receive the definition files directly, or the network and client facilities may both receive the definition files, or the like. In an embodiment, the definition files may be updated on a fixed periodic basis, on demand by the network and/or the client facility, as a result of an alert of a new malicious code or malicious application, or the like. In an embodiment, the definition files may be released as a supplemental file to an existing definition files to provide for rapid updating of the definition files.

In a similar manner, the security management facility 122 may be used to scan an outgoing file and verify that the outgoing file is permitted to be transmitted per the enterprise facility 102 rules and policies. By checking outgoing files, the security management facility 122 may be able discover malicious code infected files that were not detected as incoming files as a result of the client facility having been updated with either new definition files or policy management facility 112 information. The definition files may discover the malicious code infected file by having received updates of developing malicious code from the administration facility 134, updates from a definition files provider, or the like. The policy management facility 112 may discover the malicious code infected file by having received new updates from the administration facility 134, from a rules provider, or the like.

The threat management facility 100 may provide controlled access to the enterprise facility 102 networks. For instance, a manager of the enterprise facility 102 may want to restrict access to certain applications, networks, files, printers, servers, databases, or the like. In addition, the manager of the enterprise facility 102 may want to restrict user access based on certain criteria, such as the user's location, usage history, need to know, job position, connection type, time of day, method of authentication, client-system configuration, or the like. Network access rules may be developed for the enterprise facility 102, or pre-packaged by a supplier, and managed by the threat management facility 100 in conjunction with the administration facility 134.

A network access rules facility 124 may be responsible for determining if a client facility application should be granted access to a requested network location. The network location may be on the same network as the facility or may be on another network. In an embodiment, the network access rules facility 124 may verify access rights for client facilities from within the network or may verify access rights of computer facilities from external networks. When network access for a client facility is denied, the network access rules facility 124 may send an information file to the client facility containing. For example, the information sent by the network access rules facility 124 may be a data file. The data file may contain a number of commands, definitions, instructions, or the like to be parsed and acted upon through the remedial action facility 128, or the like. The information sent by the network access facility rules facility 124 may be a command or command file that the remedial action facility 128 may access and take action upon.

The network access rules facility 124 may include databases such as a block list, a black list, an allowed list, a white list, an unacceptable network site database, an acceptable network site database, a network site reputation database, or the like of network access locations that may or may not be accessed by the client facility. Additionally, the network access rules facility 124 may incorporate rule evaluation; the rule evaluation may parse network access requests and apply the parsed information to network access rules. The network access rule facility 124 may have a generic set of rules that may be in support of an enterprise facility's 102 network access policies, such as denying access to certain types of websites, controlling instant messenger accesses, or the like. Rule evaluation may include regular expression rule evaluation, or other rule evaluation method for interpreting the network access request and comparing the interpretation to the established rules for network access. In an embodiment, the network access rules facility 124 may receive a rules evaluation request from the network access control and may return the rules evaluation to the network access control.

Similar to the threat definitions facility 114, the network access rule facility 124 may provide updated rules and policies to the enterprise facility 102. The network access rules facility 124 may be maintained by the network administration facility 134, using network access rules facility 124 management. In an embodiment, the network administration facility 134 may be able to maintain a set of access rules manually by adding rules, changing rules, deleting rules, or the like. Additionally, the administration facility 134 may retrieve predefined rule sets from a remote provider of a set of rules to be applied to an entire enterprise facility 102. The network administration facility 134 may be able to modify the predefined rules as needed for a particular enterprise facility 102 using the network access rules management facility 124.

When a threat or policy violation is detected by the threat management facility 100, the threat management facility 100 may perform or initiate a remedial action facility 128. Remedial action may take a plurality of forms, such as terminating or modifying an ongoing process or interaction, sending a warning to a client or administration facility 134 of an ongoing process or interaction, executing a program or application to remediate against a threat or violation, record interactions for subsequent evaluation, or the like. Remedial action may be associated with an application that responds to information that a client facility network access request has been denied. In an embodiment, when the data file is received, remedial action may parse the data file, interpret the various aspects of the data file, and act on the parsed data file information to determine actions to be taken on an application requesting access to a denied network location. In an embodiment, when the data file is received, remedial action may access the threat definitions to parse the data file and determine an action to be taken on an application requesting access to a denied network location. In an embodiment, the information received from the facility may be a command or a command file. The remedial action facility may carry out any commands that are received or parsed from a data file from the facility without performing any interpretation of the commands. In an embodiment, the remedial action facility may interact with the received information and may perform various actions on a client requesting access to a denied network location. The action may be one or more of continuing to block all requests to a denied network location, a malicious code scan on the application, a malicious code scan on the client facility, quarantine of the application, terminating the application, isolation of the application, isolation of the client facility to a location within the network that restricts network access, blocking a network access port from a client facility, reporting the application to an administration facility 134, or the like.

Remedial action may be provided as a result of a detection of a threat or violation. The detection techniques facility 130 may include monitoring the enterprise facility 102 network or endpoint devices, such as by monitoring streaming data through the gateway, across the network, through routers and hubs, and the like. The detection techniques facility 130 may include monitoring activity and stored files on computing facilities, such as on server facilities 142, desktop computers, laptop computers, other mobile computing devices, and the like. Detection techniques, such as scanning a computer's stored files, may provide the capability of checking files for stored threats, either in the active or passive state. Detection techniques, such as streaming file management, may provide the capability of checking files received at the network, gateway facility, client facility, and the like. This may provide the capability of not allowing a streaming file or portions of the streaming file containing malicious code from entering the client facility, gateway facility, or network. In an embodiment, the streaming file may be broken into blocks of information, and a plurality of virus identities may be used to check each of the blocks of information for malicious code. In an embodiment, any blocks that are not determined to be clear of malicious code may not be delivered to the client facility, gateway facility, or network.

Verifying that the threat management facility 100 is detecting threats and violations to established policy, may require the ability to test the system, either at the system level or for a particular computing component. The testing facility 118 may allow the administration facility 134 to coordinate the testing of the security configurations of client facility computing facilities on a network. The administration facility 134 may be able to send test files to a set of client facility computing facilities to test the ability of the client facility to determine acceptability of the test file. After the test file has been transmitted, a recording facility may record the actions taken by the client facility in reaction to the test file. The recording facility may aggregate the testing information from the client facility and report the testing information to the administration facility 134. The administration facility 134 may be able to determine the level of preparedness of the client facility computing facilities by the reported information. Remedial action may be taken for any of the client facility computing facilities as determined by the administration facility 134; remedial action may be taken by the administration facility 134 or by the user of the client facility.

The threat research facility 132 may provide a continuously ongoing effort to maintain the threat protection capabilities of the threat management facility 100 in light of continuous generation of new or evolved forms of malware. Threat research may include researchers and analysts working on known and emerging malware, such as viruses, rootkits a spyware, as well as other computer threats such as phishing, spam, scams, and the like. In embodiments, through threat research, the threat management facility 100 may be able to provide swift, global responses to the latest threats.

The threat management facility 100 may provide threat protection to the enterprise facility 102, where the enterprise facility 102 may include a plurality of networked components, such as client facility, server facility 142, administration facility 134, firewall 138, gateway, hubs and routers 148, appliance facility 140, desktop users, mobile users, and the like. In embodiments, it may be the endpoint computer security facility 152, located on a computer's desktop, which may provide threat protection to a user, and associated enterprise facility 102. In embodiments, the term endpoint may refer to a computer system that may source data, receive data, evaluate data, buffer data, or the like (such as a user's desktop computer as an endpoint computer), a firewall as a data evaluation endpoint computer system, a laptop as a mobile endpoint computer, a personal digital assistant or tablet as a hand-held endpoint computer, a mobile phone as an endpoint computer, or the like. In embodiments, endpoint may refer to a source or destination for data, including such components where the destination is characterized by an evaluation point for data, and where the data may be sent to a subsequent destination after evaluation. The endpoint computer security facility 152 may be an application loaded onto the computer platform or computer support component, where the application may accommodate the plurality of computer platforms and/or functional requirements of the component. For instance, a client facility computer may be one of a plurality of computer platforms, such as Windows, Macintosh, Linux, and the like, where the endpoint computer security facility 152 may be adapted to the specific platform, while maintaining a uniform product and product services across platforms. Additionally, components may have different functions to serve within the enterprise facility's 102 networked computer-based infrastructure. For instance, computer support components provided as hubs and routers 148, server facility 142, firewalls 138, and the like, may require unique security application software to protect their portion of the system infrastructure, while providing an element in an integrated threat management system that extends out beyond the threat management facility 100 to incorporate all computer resources under its protection.

The enterprise facility 102 may include a plurality of client facility computing platforms on which the endpoint computer security facility 152 is adapted. A client facility computing platform may be a computer system that is able to access a service on another computer, such as a server facility 142, via a network. This client facility server facility 142 model may apply to a plurality of networked applications, such as a client facility connecting to an enterprise facility 102 application server facility 142, a web browser client facility connecting to a web server facility 142, an e-mail client facility retrieving e-mail from an Internet 154 service provider's mail storage servers 142, and the like. In embodiments, traditional large client facility applications may be switched to websites, which may increase the browser's role as a client facility. Clients 144 may be classified as a function of the extent to which they perform their own processing. For instance, client facilities are sometimes classified as a fat client facility or thin client facility. The fat client facility, also known as a thick client facility or rich client facility, may be a client facility that performs the bulk of data processing operations itself, and does not necessarily rely on the server facility 142. The fat client facility may be most common in the form of a personal computer, where the personal computer may operate independent of any server facility 142. Programming environments for fat clients 144 may include CURI, Delphi, Droplets, Java, win32, X11, and the like. Thin clients 144 may offer minimal processing capabilities, for instance, the thin client facility may primarily provide a graphical user interface provided by an application server facility 142, which may perform the bulk of any required data processing. Programming environments for thin clients 144 may include JavaScript/AJAX, ASP, JSP, Ruby on Rails, Python's Django, PHP, and the like. The client facility may also be a mix of the two, such as processing data locally, but relying on a server facility 142 for data storage. As a result, this hybrid client facility may provide benefits from both the fat client facility type, such as multimedia support and high performance, and the thin client facility type, such as high manageability and flexibility. In embodiments, the threat management facility 100, and associated endpoint computer security facility 152, may provide seamless threat protection to the plurality of clients 144, and client facility types, across the enterprise facility 102.

The enterprise facility 102 may include a plurality of server facilities 142, such as application servers, communications servers, file servers, database servers, proxy servers, mail servers, fax servers, game servers, web servers, and the like. A server facility 142, which may also be referred to as a server facility 142 application, server facility 142 operating system, server facility 142 computer, or the like, may be an application program or operating system that accepts client facility connections in order to service requests from clients 144. The server facility 142 application may run on the same computer as the client facility using it, or the server facility 142 and the client facility may be running on different computers and communicating across the network. Server facility 142 applications may be divided among server facility 142 computers, with the dividing depending upon the workload. For instance, under light load conditions all server facility 142 applications may run on a single computer and under heavy load conditions a single server facility 142 application may run on multiple computers. In embodiments, the threat management facility 100 may provide threat protection to server facilities 142 within the enterprise facility 102 as load conditions and application changes are made.

A server facility 142 may also be an appliance facility 140, where the appliance facility 140 provides specific services onto the network. Though the appliance facility 140 is a server facility 142 computer, that may be loaded with a server facility 142 operating system and server facility 142 application, the enterprise facility 102 user may not need to configure it, as the configuration may have been performed by a third party. In an embodiment, an enterprise facility 102 appliance may be a server facility 142 appliance that has been configured and adapted for use with the threat management facility 100, and located within the facilities of the enterprise facility 102. The enterprise facility's 102 threat management appliance may enable the enterprise facility 102 to administer an on-site local managed threat protection configuration, where the administration facility 134 may access the threat resources through an interface, such as a web portal. In an alternate embodiment, the enterprise facility 102 may be managed remotely from a third party, vendor, or the like, without an appliance facility 140 located within the enterprise facility 102. In this instance, the appliance functionality may be a shared hardware product between pluralities of enterprises 102. In embodiments, the appliance facility 140 may be located at the enterprise facility 102, where the enterprise facility 102 maintains a degree of control. In embodiments, a hosted service may be provided, where the appliance facility 140 may still be an on-site black box to the enterprise facility 102, physically placed there because of infrastructure requirements, but managed by a third party, vendor, or the like.

Simple server facility 142 appliances may also be utilized across the enterprise facility's 102 network infrastructure, such as switches, routers, wireless routers, hubs and routers, gateways, print servers, net modems, and the like. These simple server facility appliances may not require configuration by the enterprise facility 102, but may require protection from threats via an endpoint computer security facility 152. These appliances may provide interconnection services within the enterprise facility 102 network, and therefore may advance the spread of a threat if not properly protected.

A client facility may be protected from threats from within the enterprise facility 102 network using a personal firewall, which may be a hardware firewall, software firewall, or combination of these, that controls network traffic to and from a client. The personal firewall may permit or deny communications based on a security policy. Personal firewalls may be designed for use by end-users, which may result in protection for only the computer on which it's installed. Personal firewalls may be able to control network traffic by providing prompts each time a connection is attempted and adapting security policy accordingly. Personal firewalls may also provide some level of intrusion detection, which may allow the software to terminate or block connectivity where it suspects an intrusion is being attempted. Other features that may be provided by a personal firewall may include alerts about outgoing connection attempts, control of program access to networks, hiding the client from port scans by not responding to unsolicited network traffic, monitoring of applications that may be listening for incoming connections, monitoring and regulation of incoming and outgoing network traffic, prevention of unwanted network traffic from installed applications, reporting applications that make connection attempts, reporting destination servers with which applications may be attempting communications, and the like. In embodiments, the personal firewall may be provided by the threat management facility 100.

Another important component that may be protected by an endpoint computer security facility 152 is a network firewall facility 138, which may be a hardware or software device that may be configured to permit, deny, or proxy data through a computer network that has different levels of trust in its source of data. For instance, an internal enterprise facility 102 network may have a high level of trust, because the source of all data has been sourced from within the enterprise facility 102. An example of a low level of trust is the Internet 154, because the source of data may be unknown. A zone with an intermediate trust level, situated between the Internet 154 and a trusted internal network, may be referred to as a "perimeter network." Since firewall facilities 138 represent boundaries between threat levels, the endpoint computer security facility 152 associated with the firewall facility 138 may provide resources that may control the flow of threats at this enterprise facility 102 network entry point. Firewall facilities 138, and associated endpoint computer security facility 152, may also be associated with a network node that may be equipped for interfacing between networks that use different protocols. In embodiments, the endpoint computer security facility 152 may provide threat protection in a plurality of network infrastructure locations, such as at the enterprise facility 102 network entry point, e.g., the firewall facility 138 or gateway; at the server facility 142; at distribution points within the network, e.g., the hubs and routers 148; at the desktop of client facility computers; and the like. In embodiments, the most effective location for threat detection may be at the user's computer desktop endpoint computer security facility 152.

The interface between the threat management facility 100 and the enterprise facility 102, and through the appliance facility 140 to embedded endpoint computer security facilities, may include a set of tools that may be the same for all enterprise implementations, but allow each enterprise to implement different controls. In embodiments, these controls may include both automatic actions and managed actions. Automatic actions may include downloads of the endpoint computer security facility 152 to components of the enterprise facility 102, downloads of updates to existing endpoint computer security facilities of the enterprise facility 102, uploaded network interaction requests from enterprise facility 102 components to the threat management facility 100, and the like. In embodiments, automatic interactions between the enterprise facility 102 and the threat management facility 100 may be configured by the threat management facility 100 and an administration facility 134 in the enterprise facility 102. The administration facility 134 may configure policy rules that determine interactions, such as developing rules for accessing applications, as in who is authorized and when applications may be used; establishing rules for ethical behavior and activities; rules governing the use of entertainment software such as games, or personal use software such as IM and VoIP; rules for determining access to enterprise facility 102 computing resources, including authentication, levels of access, risk assessment, and usage history tracking; rules for when an action is not allowed, such as whether an action is completely deigned or just modified in its execution; and the like. The administration facility 134 may also establish license management, which in turn may further determine interactions associated with a licensed application. In embodiments, interactions between the threat management facility 100 and the enterprise facility 102 may provide threat protection to the enterprise facility 102 by managing the flow of network data into and out of the enterprise facility 102 through automatic actions that may be configured by the threat management facility 100 or the administration facility 134.

Client facilities within the enterprise facility 102 may be connected to the enterprise facility 102 network by way of wired network facilities 148A or wireless network facilities 148B. Client facilities connected to the enterprise facility 102 network via a wired facility 148A or wireless facility 148B may receive similar protection, as both connection types are ultimately connected to the same enterprise facility 102 network, with the same endpoint computer security facility 152, and the same threat protected enterprise facility 102 environment. Mobile wireless facility clients 144B-F, because of their ability to connect to any wireless 148B,D network access point, may connect to the Internet 154 outside the enterprise facility 102, and therefore outside the threat-protected environment of the enterprise facility 102. In this instance the mobile client facility (e.g., the clients 144 B-F), if not for the presence of the endpoint computer security facility 152 may experience a malware attack or perform actions counter to enterprise facility 102 established policies. In addition, there may be a plurality of ways for the threat management facility 100 to protect the out-of-enterprise facility 102 mobile client facility (e.g., the clients 144 D-F) that has an embedded endpoint computer security facility 152, such as by providing URI filtering in personal routers, using a web appliance as a DNS proxy, or the like. Mobile client facilities that are components of the enterprise facility 102 but temporarily outside connectivity with the enterprise facility 102 network may be provided with the same threat protection and policy control as client facilities inside the enterprise facility 102. In addition, mobile the client facilities may receive the same interactions to and from the threat management facility 100 as client facilities inside the enterprise facility 102, where the mobile client facilities may be considered a virtual extension of the enterprise facility 102, receiving all the same services via their embedded endpoint computer security facility 152.

Interactions between the threat management facility 100 and the components of the enterprise facility 102, including mobile client facility extensions of the enterprise facility 102, may ultimately be connected through the Internet 154. Threat management facility 100 downloads and upgrades to the enterprise facility 102 may be passed from the firewalled networks of the threat management facility 100 through to the endpoint computer security facility 152 equipped components of the enterprise facility 102. In turn the endpoint computer security facility 152 components of the enterprise facility 102 may upload policy and access requests back across the Internet 154 and through to the threat management facility 100. The Internet 154 however, is also the path through which threats may be transmitted from their source. These network threats 104 may include threats from a plurality of sources, including without limitation, websites, e-mail, IM, VoIP, application software, and the like. These threats may attempt to attack a mobile enterprise client facility (e.g., the clients 144B-F) equipped with an endpoint computer security facility 152, but in embodiments, as long as the mobile client facility is embedded with an endpoint computer security facility 152, as described above, threats may have no better success than if the mobile client facility were inside the enterprise facility 102.

However, if the mobile client facility were to attempt to connect into an unprotected connection point, such as at a secondary location 108 that is not a part of the enterprise facility 102, the mobile client facility may be required to request network interactions through the threat management facility 100, where contacting the threat management facility 100 may be performed prior to any other network action. In embodiments, the client facility's 144 endpoint computer security facility 152 may manage actions in unprotected network environments such as when the client facility (e.g., client 144F) is in a secondary location 108 or connecting wirelessly to a non-enterprise facility wireless Internet connection, where the endpoint computer security facility 152 may dictate what actions are allowed, blocked, modified, or the like. For instance, if the client facility's 144 endpoint computer security facility 152 is unable to establish a secured connection to the threat management facility 100, the endpoint computer security facility 152 may inform the user of such, and recommend that the connection not be made. In the instance when the user chooses to connect despite the recommendation, the endpoint computer security facility 152 may perform specific actions during or after the unprotected connection is made, including running scans during the connection period, running scans after the connection is terminated, storing interactions for subsequent threat and policy evaluation, contacting the threat management facility 100 upon first instance of a secured connection for further actions and or scanning, restricting access to network and local resources, or the like. In embodiments, the endpoint computer security facility 152 may perform specific actions to remediate possible threat incursions or policy violations during or after the unprotected connection.

The secondary location 108 may have no endpoint computer security facilities 152 as a part of its computer components, such as its firewalls 138B, servers 142B, clients 144G, hubs and routers 148C-D, and the like. As a result, the computer components of the secondary location 108 may be open to threat attacks, and become potential sources of threats, as well as any mobile enterprise facility clients 144B-F that may be connected to the secondary location's 108 network. In this instance, these computer components may now unknowingly spread a threat to other components connected to the network.

Some threats may not come directly from the Internet 154, such as from non-enterprise facility controlled mobile devices that are physically brought into the enterprise facility 102 and connected to the enterprise facility 102 client facilities. The connection may be made from direct connection with the enterprise facility's 102 client facility, such as through a USB port, or in physical proximity with the enterprise facility's 102 client facility such that a wireless facility connection can be established, such as through a Bluetooth connection. These physical proximity threats 110 may be another mobile computing device, a portable memory storage device, a mobile communications device, or the like, such as CDs and DVDs, memory sticks, flash drives, external hard drives, cell phones, PDAs, MP3 players, digital cameras, point-to-point devices, digital picture frames, digital pens, navigation devices, tablets, appliances, and the like. A physical proximity threat 110 may have been previously infiltrated by network threats while connected to an unprotected network connection outside the enterprise facility 102, and when connected to the enterprise facility 102 client facility, pose a threat. Because of their mobile nature, physical proximity threats 110 may infiltrate computing resources in any location, such as being physically brought into the enterprise facility 102 site, connected to an enterprise facility 102 client facility while that client facility is mobile, plugged into an unprotected client facility at a secondary location 108, and the like. A mobile device, once connected to an unprotected computer resource, may become a physical proximity threat 110. In embodiments, the endpoint computer security facility 152 may provide enterprise facility 102 computing resources with threat protection against physical proximity threats 110, for instance, through scanning the device prior to allowing data transfers, through security validation certificates, through establishing a safe zone within the enterprise facility 102 computing resource to transfer data into for evaluation, and the like.

Having provided an overall context for threat detection, the description now turns to a brief discussion of an example of a computer system that may be used for any of the entities and facilities described above.

Figure 2:
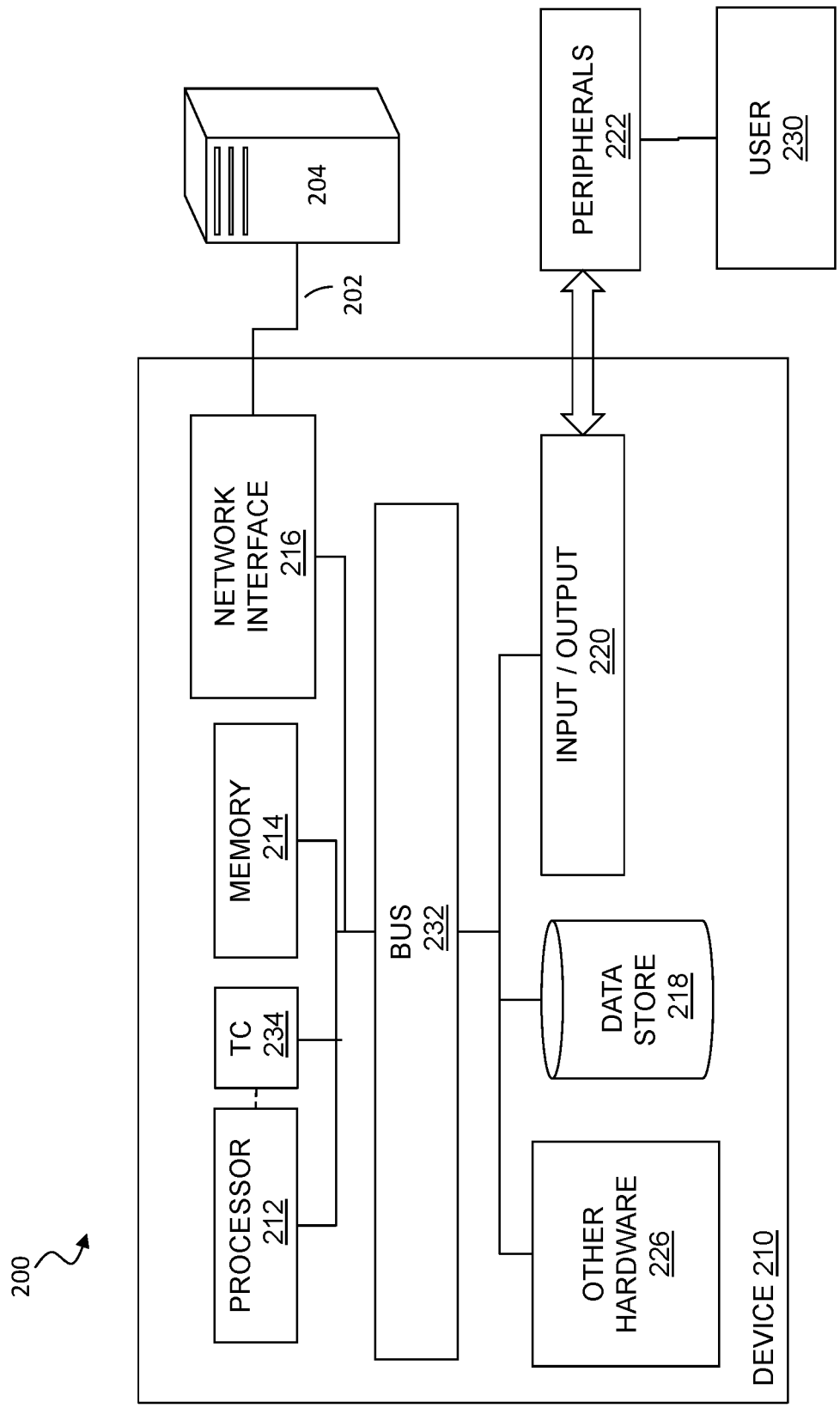
FIG. 2 illustrates a computer system.

FIG. 2 illustrates a computer system 200 including a device 210 connected to a network 202, e.g., through an external device 204. The computing device 210 may be or include any type of network endpoint or endpoints as described herein, e.g., with reference to FIG. 1 above. For example, the computing device 210 may include a desktop computer workstation. The computing device 210 may also or instead be any device suitable for interacting with other devices over a network 202, such as a laptop computer, a desktop computer, a personal digital assistant, a tablet, a mobile phone, a television, a set top box, a wearable computer, and the like. The computing device 210 may also or instead include a server such as any of the servers described herein.

The computing device 210 may be used for any of the entities described in the threat management environment described above with reference to FIG. 1. For example, the computing device 210 may be part of or may include a client an enterprise facility, a threat management facility, or any of the other facilities or computing devices described therein. In certain aspects, the computing device 210 may be implemented using hardware or a combination of software and hardware. The computing device 210 may be a standalone device, a device integrated into another entity or device, a platform distributed across multiple entities, or a virtualized device executing in a virtualization environment.

The network 202 may include any network described above, e.g., data network(s) or internetwork(s) suitable for communicating data and control information among participants in the computer system 200. This may include public networks such as the Internet, private networks, and telecommunications networks such as the Public Switched Telephone Network or cellular networks using third generation cellular technology (e.g., 3G or IMT-2000), fourth generation cellular technology (e.g., 4G, LTE. MT-Advanced, E-UTRA, etc.) or WiMax-Advanced (IEEE 802.16m)) and/or other technologies, as well as any of a variety of corporate area, metropolitan area, campus or other local area networks or enterprise networks, along with any switches, routers, hubs, gateways, and the like that might be used to carry data among participants in the computer system 200. The network 202 may also include a combination of data networks, and need not be limited to a strictly public or private network.

The external device 204 may be any computer or other remote resource that connects to the computing device 210 through the network 202. This may include threat management resources such as any of those contemplated above, gateways or other network devices, remote servers or the like containing content requested by the computing device 210, a network storage device or resource, a device hosting malicious content, or any other resource or device that might connect to the computing device 210 through the network 202.

In general, the computing device 210 may include a processor 212, a memory 214, a network interface 216, a data store 218, and one or more input/output interfaces 220. The computing device 210 may further include or be in communication with peripherals 222 and other external input/output devices that might connect to the input/output interfaces 220.

The processor 212 may be any processor or other processing circuitry capable of processing instructions for execution within the device 210 or computer system 200. The processor 212 may include a single-threaded processor, a multi-threaded processor, a multi-core processor and so forth. The processor 212 may be capable of processing instructions stored in the memory 214 or the data store 218.

The memory 214 may store information within the computing device 210. The memory 214 may include any volatile or non-volatile memory or other computer-readable medium, including without limitation a Random Access Memory (RAM), a flash memory, a Read Only Memory (ROM), a Programmable Read-only Memory (PROM), an Erasable PROM (EPROM), registers, and so forth. The memory 214 may store program instructions, program data, executables, and other software and data useful for controlling operation of the computing device 210 and configuring the computing device 210 to perform functions for a user. The memory 214 may include a number of different stages and types of memory for different aspects of operation of the computing device 210. For example, a processor may include on-board memory and/or cache for faster access to certain data or instructions, and a separate, main memory or the like may be included to expand memory capacity as desired. All such memory types may be a part of the memory 214 as contemplated herein.

The memory 214 may, in general, include a non-volatile computer readable medium containing computer code that, when executed by the computing device 210 creates an execution environment for a computer program in question, e.g., code that constitutes processor firmware, a protocol stack, a database management system, an operating system, or a combination of the foregoing, and that performs some or all of the steps set forth in the various flow charts and other algorithmic descriptions set forth herein. While a single memory 214 is depicted, it will be understood that any number of memories may be usefully incorporated into the computing device 210. For example, a first memory may provide non-volatile storage such as a disk drive for permanent or long-term storage of files and code even when the computing device 210 is powered down. A second memory such as a random access memory may provide volatile (but higher speed) memory for storing instructions and data for executing processes. A third memory may be used to improve performance by providing higher speed memory physically adjacent to the processor 212 for registers, caching and so forth.

The network interface 216 may include any hardware and/or software for connecting the computing device 210 in a communicating relationship with other resources through the network 202. This may include remote resources accessible through the Internet, as well as local resources available using short range communications protocols using, e.g., physical connections (e.g., Ethernet), radio frequency communications (e.g., WiFi), optical communications, (e.g., fiber optics, infrared, or the like), ultrasonic communications, or any combination of these or other media that might be used to carry data between the computing device 210 and other devices. The network interface 216 may, for example, include a router, a modem, a network card, an infrared transceiver, a radio frequency (RF) transceiver, a near field communications interface, a radio-frequency identification (RFID) tag reader, or any other data reading or writing resource or the like.

More generally, the network interface 216 may include any combination of hardware and software suitable for coupling the components of the computing device 210 to other computing or communications resources. By way of example and not limitation, this may include electronics for a wired or wireless Ethernet connection operating according to the IEEE 802.11 standard (or any variation thereof), or any other short or long range wireless networking components or the like. This may include hardware for short range data communications such as Bluetooth or an infrared transceiver, which may be used to couple to other local devices, or to connect to a local area network or the like that is in turn coupled to a data network 202 such as the Internet. This may also or instead include hardware/software for a WiMax connection or a cellular network connection (using, e.g., CDMA, GSM, LTE, or any other suitable protocol or combination of protocols). The network interface 216 may be included as part of the input/output devices 220 or vice-versa.

The data store 218 may be any internal memory store providing a computer-readable medium such as a disk drive, an optical drive, a magnetic drive, a flash drive, or other device capable of providing mass storage for the computing device 210. The data store 218 may store computer readable instructions, data structures, program modules, and other data for the computing device 210 or computer system 200 in a non-volatile form for subsequent retrieval and use. For example, the data store 218 may store without limitation one or more of the operating system, application programs, program data, databases, files, and other program modules or other software objects and the like.

The input/output interface 220 may support input from and output to other devices that might couple to the computing device 210. This may, for example, include serial ports (e.g., RS-232 ports), universal serial bus (USB) ports, optical ports, Ethernet ports, telephone ports, audio jacks, component audio/video inputs, HDMI ports, and so forth, any of which might be used to form wired connections to other local devices. This may also or instead include an infrared interface, RF interface, magnetic card reader, or other input/output system for coupling in a communicating relationship with other local devices. It will be understood that, while the network interface 216 for network communications is described separately from the input/output interface 220 for local device communications, these two interfaces may be the same, or may share functionality, such as where a USB port is used to attach to a WiFi accessory, or where an Ethernet connection is used to couple to a local network attached storage.

A peripheral 222 may include any device used to provide information to or receive information from the device 210. This may include human input/output (I/O) devices such as a keyboard, a mouse, a mouse pad, a track ball, a joystick, a microphone, a foot pedal, a camera, a touch screen, a scanner, or other device that might be employed by the user 230 to provide input to the computing device 210. This may also or instead include a display, a speaker, a printer, a projector, a headset or any other audiovisual device for presenting information to a user. The peripheral 222 may also or instead include a digital signal processing device, an actuator, or other device to support control or communication to other devices or components. Other I/O devices suitable for use as a peripheral 222 include haptic devices, three-dimensional rendering systems, augmented-reality displays, and so forth. In one aspect, the peripheral 222 may serve as the network interface 216, such as with a USB device configured to provide communications via short range (e.g., BlueTooth, WiFi, Infrared, RF, or the like) or long range (e.g., cellular data or WiMax) communications protocols. In another aspect, the peripheral 222 may provide a device to augment operation of the computing device 210, such as a global positioning system (GPS) device, a security dongle, or the like. In another aspect, the peripheral may be a storage device such as a flash card, USB drive, or other solid state device, or an optical drive, a magnetic drive, a disk drive, or other device or combination of devices suitable for bulk storage. More generally, any device or combination of devices suitable for use with the device 210 may be used as a peripheral 222 as contemplated herein.

Other hardware 226 may be incorporated into the device 210 such as a co-processor, a digital signal processing system, a math co-processor, a graphics engine, a video driver, and so forth. The other hardware 226 may also or instead include expanded input/output ports, extra memory, additional drives (e.g., a DVD drive or other accessory), and so forth.

A bus 232 or combination of busses may serve as an electromechanical platform for interconnecting components of the device 210 such as the processor 212, memory 214, network interface 216, other hardware 226, data store 218, and input/output interface. As shown in the figure, each of the components of the computing device 210 may be interconnected using a system bus 232 or other communication mechanism for communicating information.

Methods and systems described herein may be realized using the processor 212 of the device 210 to execute one or more sequences of instructions contained in the memory 214 to perform predetermined tasks. In embodiments, the device 210 may be deployed as a number of parallel processors synchronized to execute code together for improved performance, or the device 210 may be realized in a virtualized environment where software on a hypervisor or other virtualization management facility emulates components of the device 210 as appropriate to reproduce some or all of the functions of a hardware instantiation of the device 210.

The device 210 may include a trusted component 234. The trusted component may provide information that may be shared with a verifier, such as a verification service, to confirm that a trusted observer has observed the "boot" or initial operation of a device. The trusted component may communicate with the processor 212 over the system bus 232 or may have another connection to the processor 212, for example a serial or parallel communication path. The trusted component 234 may receive commands from the processor 212 and may respond to commands from the processor 212. The trusted component may provide trusted functionality and securely store artifacts used to authenticate and measure a device in which it is installed. The artifacts may include, for example, passwords, certificates, and encryption keys. The artifacts may be used, for example, for authentication, demonstrating that a platform is what it claims to be. The artifacts may be used to take and store measurements that may be used to demonstrate that the computing device is trustworthy.

Described herein are techniques for securing boot processes of devices. In general, techniques may be used to assure security of a device such as that shown in FIG. 2, such that a trusted component can provide information that may be shared with a verifier, such as a verification service, to confirm that a trusted observer has observed the "boot" or initial operation of a device. The boot may include the operations performed up to the execution of an operating system. There may be more than one level of boot, for example, a first boot program may be loaded, then an initial operating system, and then the operating system that is used by a user. The boot may include activities up to the first operating system, or may include activities up to and including operation of the final operating system. In some cases, a virtualization system is used, and so the boot may include operations up to and including the running of the virtualization system. In some cases, boot may include operation up to and including running an operating system or a virtualization system.

Figure 3:
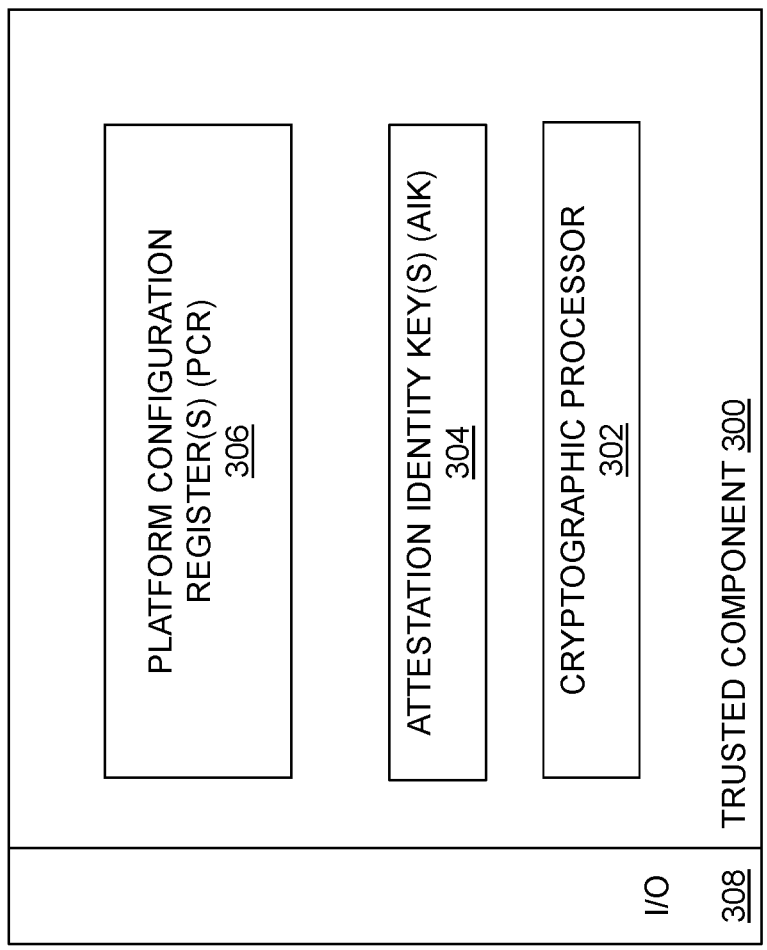
FIG. 3 illustrates an embodiment of a trusted component.

Referring to FIG. 3, an exemplary trusted component 300 is shown. The trusted component 300 shown is an example, and in various implementations other standard or non-standard trusted components may be used. In some implementations, the trusted component 300 may serve as the trusted component 234 of FIG. 2. The trusted component may be used to generate proofs relating to the items used to initiate operation of a device. For example, a proof may demonstrate that an external service not on the local device may validate that the trusted component 300 and trusted boot items made observations about what booted and that boot information has not been corrupted, altered or replayed. A proof may be a cryptographic operation that demonstrates something with an acceptable level of certainty. A proof may be or may include, for example, a hash or a digital signature. A proof may include any additional information, for example hash changes or cryptographic extends, to ensure that data observed is signed for integrity to allow an external service to validate the information provided. A certificate or a certificate chain may be included in a proof or associated with a proof to validate digital signatures.

The trusted component 300 may be used to generate proofs that an external observer observed items used to initiate operation of the device. A verifier, for example, a verifying service, may review proofs generated by the trusted component and reach conclusions about the items used to initiate operation of the device.

The trusted component 300 may be included in a microprocessor or other integrated circuit. The trusted component 300 may be implemented partially or entirely in software with suitable security features provided by hardware, for example, to safely store keys and prevent tampering. A trusted component 300 may have a portion of the features shown and may have additional features.

The trusted component 300 may be implemented with or using a trusted platform module (TPM) or use or include features of a trusted platform module. Standards and specifications for TPMs have been developed by the Trusted Computing Group, and may be found at http://www.trustedcomputinggroup.org. A trusted component 300 may or may not implement some or all of one or more requirements of one or more Trusted Computing Group standards.

The trusted component 300, may be a hardware component (e.g., one or more computer chips, a microcontroller) that may provide trusted functionality and securely store artifacts used to authenticate and measure a device in which it is installed. The artifacts may include, for example, passwords, certificates, and encryption keys. The artifacts may be used, for example, for authentication, demonstrating that a platform is what it claims to be. The trusted component 300 also may be used to take and store measurements that may be used for attestation, demonstrating that a device (e.g., computer, laptop, mobile phone, television, sensor, appliance, thermostat, etc.) is trustworthy. For small devices, such as networked sensors, appliances, thermostats, etc., it may be that the processor includes or is in communication with a minimally featured trusted component to achieve boot security without other features that may be provided by a more full-featured trusted platform module.

In some implementations, the trusted component 300 may communicate with a processor or processors on the device via a secure input/output (I/O) interface 312. The interface may be a direct connection to the processor, or may be a bus that includes one or more other devices. The I/O interface may perform protocol encoding/decoding suitable for communication over external and internal buses. In implementations where the trusted component 300 is included within a processor or other circuits, the I/O interface 312 may be omitted or modified from what is described. For example, the I/O interface may be a serial communication interface, a parallel communication interface, a bus interface, etc.

The trusted component 300 may include a cryptographic processor 302. The cryptographic processor 302 may be a cryptographic co-processor. The cryptographic processor 302 may implement cryptographic operations, such as asymmetric key generation (e.g., generating cryptographic keys), asymmetric encryption/decryption (e.g., RSA encryption/decryption), symmetric encryption/decryption, digital signatures (e.g., RSA signatures), hashing (e.g., SHA-1 hashes), and random number generation (RNG) as supported by the trusted component 300. The cryptographic processor 302 may include one or more subsystems to perform encryption, decryption, and signature operations, and may support one or more of a variety of encryption, hashing, and signature technologies.

The trusted component may use one or more Attestation Identity Keys (AIKs) 304. A component of an attestation solution may verify that measurements come from the device intended using the AIK 304. For example, an AIK 304 may be used in a proof, for example, to sign an attestation. An AIK 304 may be created or provisioned to enable trust in the trusted component 300. For example, an AIK 304 may be cryptographically certified, for example, by a third party, in an AIK certificate. For example, an AIK 304 may be cryptographically certified by the trusted component 300 using another key installed in the trusted component 300.

A trusted component 300 may contain one or more platform configuration registers (PCRs) 306. A PCR 306 is a secure register that may be used to provide a cryptographic representation of software and a state of a device when it booted. In some implementations, the trusted component 300 has 16 PCRs 306. In some implementations the trusted component 300 has 24 PCRs 306. In some implementations, the trusted component 300 has 64 PCRs 306. In some implementations, one or more PCRs 306 are set to zero when the device is booted, and software that first runs on the device has the job to measure software in the boot chain (e.g., the programs that are sequentially run to initialize the device) and to record the measurements in one or more of the PCRs 306. In some implementations, boot items each take the hash of the next boot item that is to be run and record the hash measurements in a PCR 306. In some implementations, a subset of the boot chain is recorded in one PCR 306 and an overlapping or different subset of the boot chain is recorded in another PCR 306.

In some implementations, writing to a PCR 306 may be accomplished with an extend operation (e.g., TPM_Extend). In some implementations, the extend operation causes the trusted component to calculate a one-way function (e.g., SHA-1 hash) using a current PCR value and a one-way function (e.g., SHA-1 hash) calculated on one or more boot items as inputs. A verifier that knows the values extended into the PCRs with the extend operation may verify the values that were used to calculate the PCR value(s).

Through use of the extend operation, one or more PCRs 306 may record a cumulative hash of components that have been measured. The value in a PCR on its own may be hard to interpret as it is just a hash value, but devices may keep a log with details of the software and configurations that have been recorded, and associated hash values that were extended into the PCR. The PCRs 306 may be used to determine whether a list of boot items, or the items included in a list of boot items, has been tampered with. In some implementations, an initial component that starts a measurement chain is implicitly trusted, and is referred to as a core root of trust for measurement. Device manufacturers may have a secure update process for the core root of trust or may restrict updates to it.

Verifying that a trusted component 300 proof is valid may involve one or more of several steps.

A verifier may check that set of boot information is signed by a trustworthy AIK 304. For example, this may be accomplished by checking that the public part of the AIK 304 asymmetric key pair is listed in a database of assets. This may be accomplished, for example, by verifying a certificate. Once the public part of the AIK 304 has been checked, the proof may be checked to see whether it is a valid signature over the set of boot information. Lists of boot items and associated proofs may be checked to ensure that they match proofs (e.g., PCR values) reported. A list of boot items may be examined to see whether it represents known or valid sets of boot information.

A verifier may check that set of boot information is signed by a trustworthy AIK 304. For example, this may be accomplished by checking that the public part of the AIK 304 asymmetric key pair is listed in a database of assets. This may be accomplished, for example, by verifying a certificate. Once the public part of the AIK 304 has been checked, the proof may be checked to see whether it is a valid signature over the set of boot information. Lists of boot items and associated proofs may be checked to ensure that they match proofs (e.g., PCR values) reported. A list of boot items may be examined to see whether it represents known or valid sets of boot information.

Figure 4:
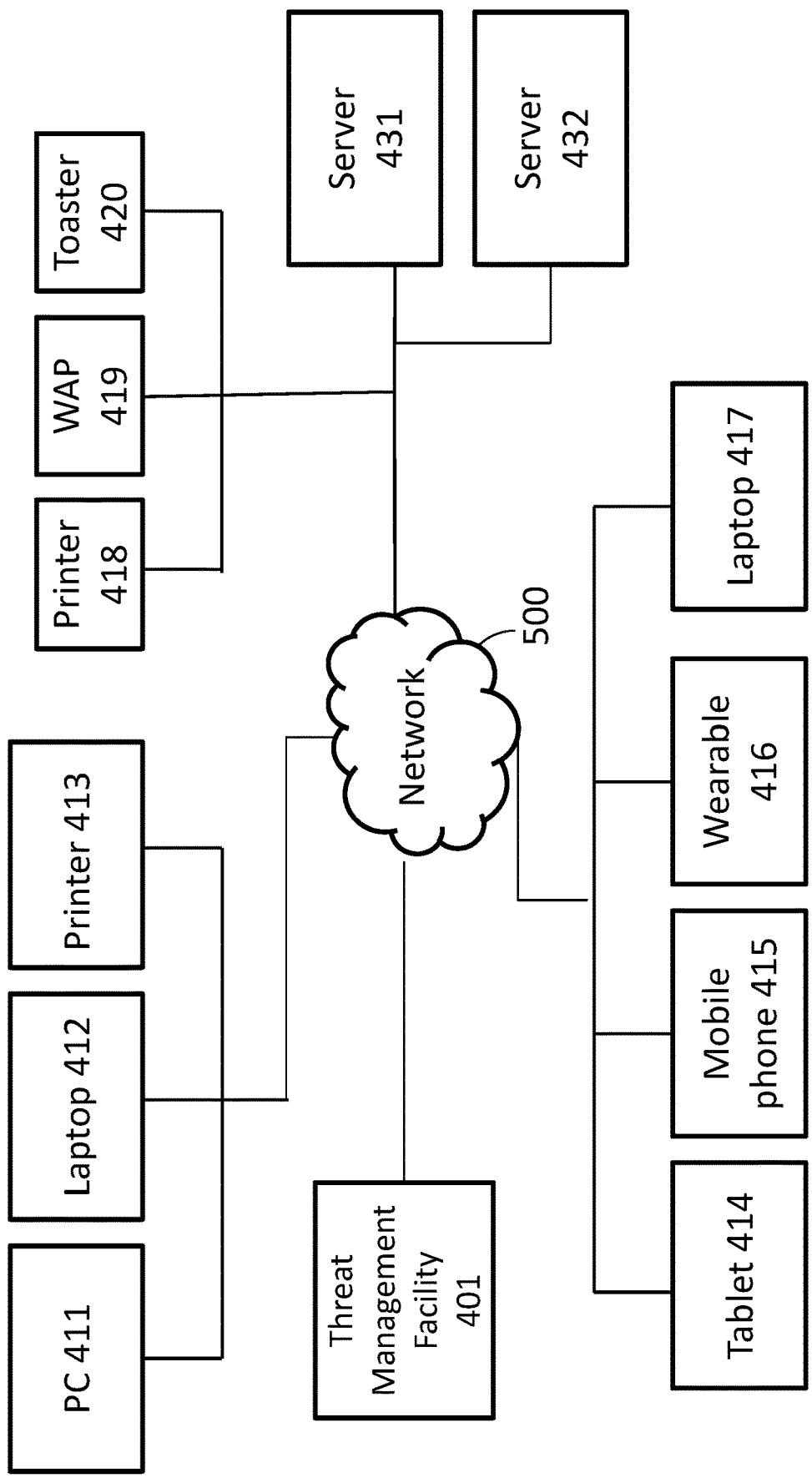
FIG. 4 illustrates an environment for device operation.

Referring to FIG. 4, an example network 400 may include a threat management facility 401, which may be an implementation of a threat management facility 100 (FIG. 1). It should be understood that the threat management facility 401 is exemplary. The network 400 may include client devices, exemplified as client devices such as a personal computer 411, a laptop 412, a printer 413, a tablet 414, a mobile phone 415, a wearable (e.g., watch, glasses, etc.) 416, a laptop 417, a printer 418, a wireless access point (WAP) 419, and a connected toaster 410. The network may include servers 431, 432. It should be understood that the number of and type of client devices 411-420 and the number and type of servers 431, 432 is demonstrative and there may be any number, including a large number of clients 411-420 and servers 431, 432. The clients 411-420 and servers 431,432 may be located anywhere, with any number of different types of network connections. There may be any number of access points, gateways, firewalls, and so forth that are not shown in the figure but will be understood to be included in the network 400.

For example, the tablet 414 may be located in a school and the printer 418, WAP 419, and Toaster 420 may be located in a home or office. The server 431 may be located in a home and the server 432 may be a cloud server located in a data center. The clients 411-420 and servers 431, 432 may be implemented with similar or different hardware, operating systems and configurations (e.g., hardware and software configurations). Yet, some or all of the clients 411-420 and servers 431, 432 may include functionality to provide proofs of sets of boot information, and may interact with verifiers of sets of boot information, in order to secure initial operation of the clients 411-420 and servers 431, 432.

In some implementations, a trusted component, such as the trusted component 300 (FIG. 3), may be included on clients 411-420 and servers 431, 432 to provide proofs and secure communication with a verifier. In some implementations, a verifier may be implemented as part of a threat management facility 401 to review sets of boot information and to provide alerts based on the sets of boot information. In some implementations a verifier may include one or more servers 431, 432 to communicate with clients 411-420 and receive sets of boot information. The servers 431, 432 may in turn forward the sets of boot information to the threat management facility 401 or provide analysis or results of analysis of the sets of boot information to the threat management facility 401.

Figure 5:
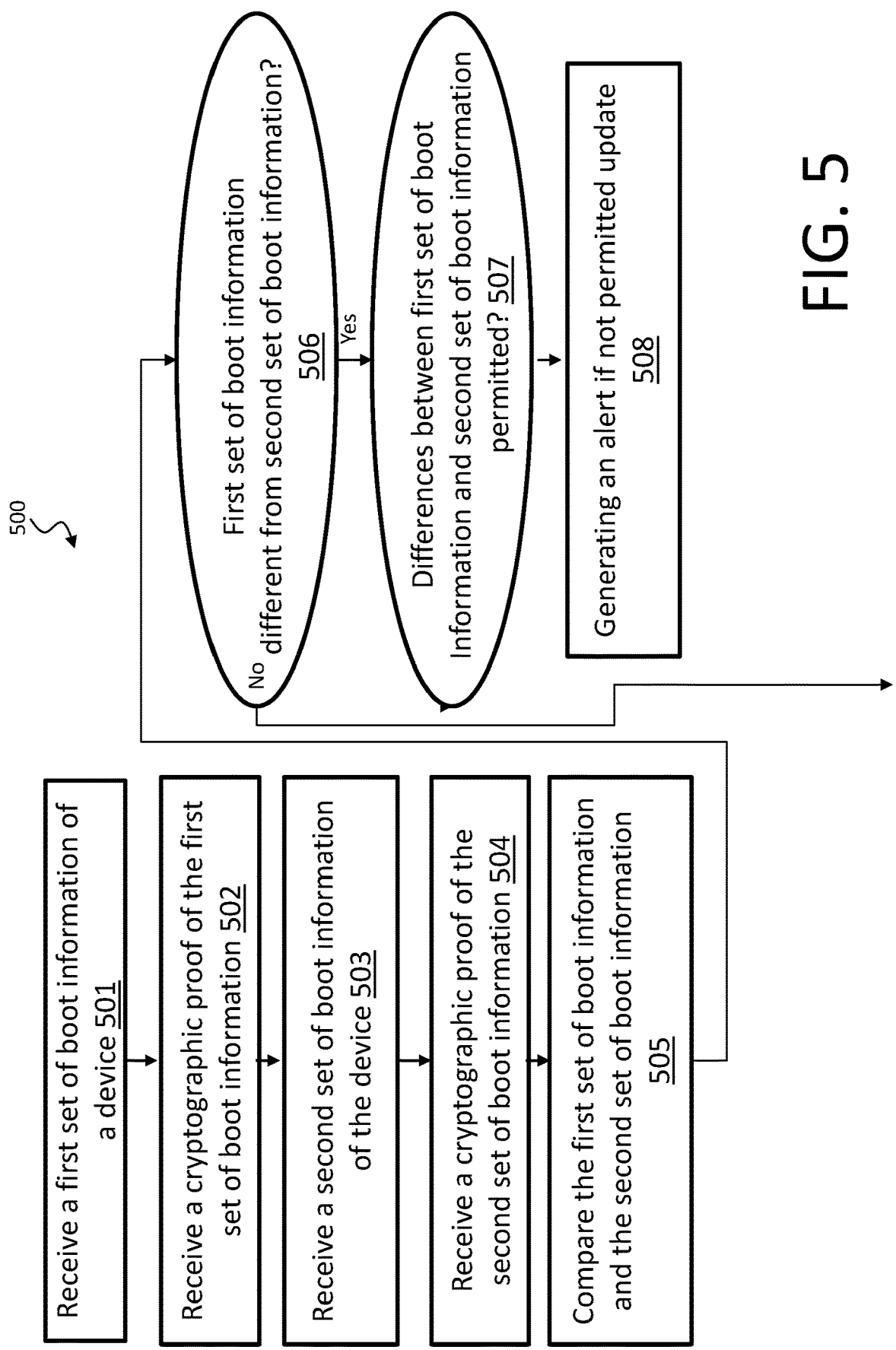
FIG. 5 is a flowchart of a method for boot security.

Referring to FIG. 5, a method 500 for securing a device may include receiving a first set of boot information of the device 501. The first set of boot information may include information about the device, such as information about hardware, software, and configuration of the device. The first set of boot information may include information about software programs and data that are accessed by the device as part of its initial operation. The first set of boot information may include information about the initial operation of a device. The first set of boot information may include a list of boot items that are or may be executed (e.g., for executables) or are or may be accessed (e.g., for configuration or data) for the initial operation of a device. The first set of boot information may include a list of ROM entries, such as BIOS, option ROMs, motherboard ROMs and code, etc. It should be understood that ROM entries may include code or data that is included on PROMs or any other storage devices that may be accessed in the initial operation of a device.

The first set of boot information may include specific information about hardware and software installed on the device, including, for any or some hardware and software integrated or installed on the device, an identification of manufacturer, release date, or version. The first set of information may include information about optional hardware or software that may have impact on initial operation, for example, storage drives or network devices. The first set of information may include a device identifier, which may be an identifier of the device or a trusted component of the device. The first set of information may include one or more cryptographic proofs. The cryptographic proofs may be calculated over one or more other items in the set of boot information. A first proof may be determined based on a first subset of the set of boot information and a second proof may be determined based on a second subset of the set of boot information. The proofs may be determined by a trusted component of the device. The proofs may be determined by one or more boot items when they execute. The proofs may be part of a chain of trust, where a first boot item determines a proof for one or more boot items that will execute after the first boot item.

The first set of boot information may include or be associated with an attestation. An attestation may include one or more cryptographic proofs. The attestation may include a signature of a trusted device on one or more other proofs and other information in the set of boot information.

The first set of boot information may be received in any suitable manner. The first set of boot information may be received over a network, over a bus, by storing it on a data storage device, etc.

The method 500 may include receiving a first cryptographic proof of the first set of boot information 502. The proof may be included in the first set of boot information or may be received separately from the first set of boot information. The proof may be used to demonstrate that a trusted observer made certain measurements or observations about the initial operation of a device. The proof may be used to demonstrate, for example, that a trusted component of a device measured one or more boot items of the device. The proof may be used to demonstrate, for example, that a software program that was measured by a trusted component measured one or more boot items of the device. For example, a verifier may calculate one-way functions over the same data that was used in the proof, and then check the result. For example, a verifier may verify a digital signature by using a public key of an asymmetric key pair. If the proof is determined to be invalid or untrustworthy for any reason, then the first set of boot information is not useful, because it is not trusted. A user or administrator may be notified that the device is not operating properly, or a report may be provided on a user interface, a device may be treated as compromised, and so on.

The method 500 may include receiving a second set of boot information of the device 503. The second set of boot information may be similar or different in format from the first set of boot information. If the second set of boot information is similar in format to the first set of boot information, it will be possible for a verifier to determine whether boot information of the device has changed, for example, by comparing boot information (e.g., boot items specified) in the first set of boot information to boot information in the second set of boot information.

The method 500 may include receiving a second cryptographic proof of the second set of boot information 504. The second cryptographic proof may be included in or received separately from the second set of boot information. The proof may be used to demonstrate that a trusted observer made certain measurements or observations about the initial operation of a device. The proof may be used to demonstrate, for example, that a trusted component of a device measured one or more boot items of the device. The proof may be used to demonstrate, for example, that a software program that was measured by a trusted component measured one or more boot items of the device. For example, a verifier may calculate one-way functions over the same data that was used in the proof, and then check the result. For example, a verifier may verify a digital signature by using a public key of an asymmetric key pair. If the proof is determined to be invalid or untrustworthy for any reason, then that set of boot information is not useful, because it is not trusted. A user or administrator may be notified that the device is not operating properly, or a report may be provided on a user interface, a device may be treated as compromised, and so on. For example, an alert may be generated, or a report may be generated as if a change that is not permitted has taken place. For example, it may be considered that a change has occurred that the device is no longer delivering trusted boot information and proofs.

The method 500 may include comparing 505 the first set of boot information and the second set of boot information. The comparing may include identifying any differences between the first set of boot information and the second set of boot information. The comparing may include determining differences between lists of boot items. The comparing may include determining differences between proofs (e.g., hashes) calculated on one or more boot items. The comparing may include identifying differences in device identifiers, device hardware and software versions, hardware and software installed, etc.

In some implementations, differences in boot items listed in the first and second sets of boot information may be used to determine that boot items have been added or removed, or that the order in which they are accessed or executed has changed. A boot item may have been added or removed due to a hardware or software change. A boot item may have been added or removed due to the activity of malware or an attacker.

In some implementations, differences in hashes calculated on boot items listed in the first and second sets of boot information may be used to determine that a boot item has changed. A boot item may have changed due to a version update from a device manufacturer. A boot item may have changed due to the activity of malware or an attacker.

Upon determining that the first set of boot information and the second set of boot information are different, the method 500 may include determining whether differences between the first set of boot information and the second set of boot information are permitted 507. Differences between the first set of boot information and the second set of boot information may be permitted, for example, if the differences are consistent with an update. Differences between the first set of boot information and the second set of boot information may not be permitted, for example, if the differences are consistent with a compromise (e.g., malware or an attacker). A difference between the first set of boot information and the second set of boot information may be permitted, for example, if a boot item that changed is on a "white list" of boot items that are permitted. A difference between the first set of boot information and the second set of boot information may not be permitted, for example, if a boot item that changed is on a "black list" of boot items that are not permitted. A boot item on a white list or black list may be identified by a version number that is provided in the first set of boot information. A boot item on a white list or black list may be identified by the result of a one-way function that is calculated on the boot item, and the result included in the set of boot information.

The method 500 may include generating an alert upon determining that differences between the first set of boot information and the second set of boot information are not permitted. Any suitable alert or reporting may be used to notify a user, administrator, device, threat management facility, or server that a difference in the boot information is not permitted. Just as a few examples, a change to a boot item may be suspicious or indicative of compromise, may make a device more vulnerable, or may be prohibited by a system administrator.

An alert may be communicated to a reporting system, to an administration system, to a messaging system (e.g., email, text message, instant message, system notification, etc.). For example, an email message may be sent to a user or administrator. For example, a system notification may be provided in the notifications of a mobile device. A device that is suspected or convicted of compromise may be designated for isolation or remediation. For example, a threat management facility 100 may notify software on the suspected or convicted device or notify other devices to directly or indirectly isolate the suspected or convicted device. For example, a network device may interrupt network activity to the device, entirely or limit activity to the threat management facility 100 or to a system that can provide remediation. Disrupting network activity can stop the spread of the compromise to other devices. For example, a network monitor on the device may shut down network communication to and from the suspected or convicted device. For example, other devices may be notified that they should not accept or receive communication from the suspected or convicted device. For example, a network monitor on other devices may disrupt communication with the suspected or convicted device. In some implementations, communication is restricted to a gateway and the threat management facility 100 or another server that can provide remediation.

Figure 6:
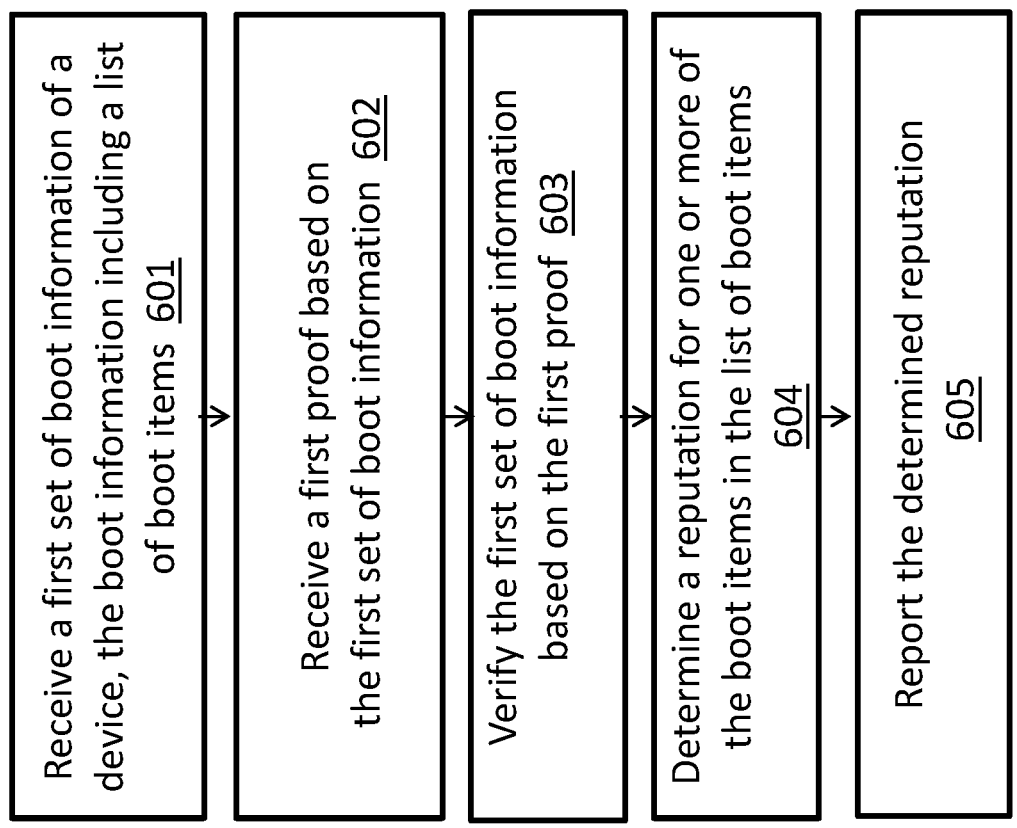
FIG. 6 is a flowchart of a method for boot security.

Referring to FIG. 6, a method 600 for securing a device may include receiving a first set of boot information of the device 601. The first set of boot information may include information about the device, such as information about hardware, software, and configuration of the device. The first set of boot information may include information about software programs and data that are accessed by the device as part of its initial operation. The first set of boot information may include information about the initial operation of a device. The first set of boot information may include a list of boot items that are or may be executed (e.g., for executables) or are or may be accessed (e.g., for configuration or data) for the initial operation of a device. The first set of boot information may include a list of ROM entries, such as BIOS, option ROMs, motherboard ROMs and code, etc. It should be understood that ROM entries may include code or data that is included on PROMs or any other storage devices that may be accessed in the initial operation of a device.

The first set of boot information may include specific information about hardware and software installed on the device, including, for any or some hardware and software integrated or installed on the device, an identification of manufacturer, release date, or version. The first set of information may include information about optional hardware or software that may have impact on initial operation, for example, storage drives or network devices. The first set of information may include a device identifier, which may be an identifier of the device or a trusted component of the device. The first set of information may include one or more cryptographic proofs (e.g., hashes that are signed, cryptographic signatures). The cryptographic proofs may be calculated over one or more other items in the set of boot information. A first proof may be determined based on a first subset of the set of boot information and a second proof may be determined based on a second subset of the set of boot information. The proofs may be determined by a trusted component of the device. The proofs may be determined by one or more boot items when they execute. The proofs may be part of a chain of trust, where a first boot item determines a proof for one or more boot items that will execute after the first boot item.

The first set of boot information may include or be associated with an attestation. An attestation may include one or more cryptographic proofs. The attestation may include a signature of a trusted device on one or more other proofs and other information in the set of boot information.

The first set of boot information may be received in any suitable manner. The first set of boot information may be received over a network, over a bus, by storing it on a data storage device, etc.

The first set of boot information may include a list of boot items. The list of boot items may identify which boot items were accessed or executed by the device as part of initial operation. The list of boot items may include a proof calculated on one or more of the boot items. The list of boot items may be or may include portions or all of a "boot log" that is generated when a device boots.

The method 600 may include receiving a first cryptographic proof of the first set of boot information 602. The proof may be included in the first set of boot information or may be received separately from the first set of boot information. The proof may be used to demonstrate that a trusted observer made certain measurements or observations about the initial operation of a device. The proof may be used to demonstrate, for example, that a trusted component of a device measured one or more boot items of the device. The proof may be used to demonstrate, for example, that a software program that was measured by a trusted component measured one or more boot items of the device.

The method 600 may include verifying the first set of boot information based on the first proof. This may include calculating one-way functions over the data that was used to generate the proof, and comparing the result to the result in the proof. This may include verifying a digital signature by confirming that a signature was made with a private key of an asymmetric key pair. This may include verifying the public key of the asymmetric key pair with one or more certificates, or by comparing the public key to a public key previously provided or authenticated.

The method 600 may include determining a reputation for one or more of the boot items in the list of boot items 604.

A reputation may be determined in a variety of ways.

A verifier may have access to a database of boot item reputation information, and determine a reputation based on the information in the reputation database. For example, a boot item may be on a white list (known good reputation) or a black list (known bad reputation). A verifier may determine a reputation for a boot item based on a number of devices that have reported having the boot item. A server may determine a reputation for a boot item based on a number of devices that reported a change to the boot item. A server may determine a reputation for a boot item based on a pattern of changes from another boot item to the boot item.

In some implementations, by watching the pattern of change across a large number of devices, it is possible to decide whether a boot item is associated with a manufacturer update rather than malware or an attacker. For example, a manufacturer typically will typically release an update to a large number of devices at once, and those changes will likely be reported simultaneously when those devices first use this method. For example, for some devices, a manufacturer may make updates from time to time of their hardware by changing optional hardware or components on the hardware itself. In so doing the manufacturer may change Option ROMs, Boot PROM, or other local and updatable memory that may alter the boot items for the hardware in question. When updated devices first come on line and provide sets of boot information they will have an observable pattern which a verifying service can differentiate from a typical infection or targeted attack on a specific set of machines or class of victims.

Similarly, when a manufacturer has updates to BIOS or other boot code, the changes typically will be relatively slowly used by and updated on various devices. As such the usage pattern may be observed. The pattern of update from a manufacturer may be visible in a region, or to a class of user (e.g., home vs. corporate), or to a type of hardware or another distinguishing characteristic that may be correlated to user or hardware.

Absent compromise of a manufacturer's update utility, changes due to malware or an attacker will appear to have a relatively slower and gradual pattern of change, as systems typically need to communicate to infect each other, and an attacker must move from machine to machine, even if attacks are automated. For some malware, it may be expected to have a linear or exponential pattern of change, particularly when viewed according to a geographic region, a class of user, or to a type of hardware. The pattern may be more readily observed using partitioning mechanisms as mentioned above.

In some implementations, the reputation for one or more boot items may be based on timing of appearance of the one or more of the boot items on multiple devices. For example, if the timing of appearance on multiple devices may be consistent with an update the reputation may be positive, and if the timing of appearance of the one or more of the boot items on multiple devices is consistent with malware, the reputation may result in suspicion or conviction.

A reputation may be determined by evaluating boot items. For example, it may be possible for a validating service to request a copy of the boot items and configuration specifically from a device. For example, a separate channel may allow for such a communication and request. The validating service may validate it, and then store that information for further validation of subsequent client boot information and for the boot items to undergo static and dynamic analysis to identify malware.

In some implementations, it may be possible that copies of the boot items may be available directly from the manufacturer, or from a device directly obtained by the verification service, etc. In such a case, boot items may undergo static or dynamic analysis to identify malware.

In some implementations, a reputation may be determined by associating changes to boot items with devices determined to be compromised. For example, if a device is determined to be compromised, and boot items changed within a predetermined time period from the discovery of compromise, the reputation of the changed boot items may be set accordingly.

The method 600 may include reporting the determined reputation 605. Any suitable reporting method or alert may be used to notify a user, administrator, device, threat management facility, or server about the determined reputation. For example, if the determined reputation meets or does not meet a threshold reputation, a report may be generated. Just as a few examples, a reputation associated with a boot item may be suspicious or indicative of compromise, or may be prohibited by a system administrator.

A report may be communicated to a reporting system, to an administration system, to a messaging system (e.g., email, text message, instant message, system notification, etc.). For example, an email message may be sent to a user or administrator. For example, a system notification may be provided in the notifications of a mobile device.

A device that is suspected or convicted of compromise may be designated for isolation or remediation. For example, a threat management facility 100 may notify software on the suspected or convicted device or notify other devices to directly or indirectly isolate the suspected or convicted device. For example, a network device may interrupt network activity to the device, entirely or limit activity to the threat management facility 100 or to a system that can provide remediation. Disrupting network activity can stop the spread of the compromise to other devices. For example, a network monitor on the device may shut down network communication to and from the suspected or convicted device. For example, other devices may be notified that they should not accept or receive communication from the suspected or convicted device. For example, a network monitor on other devices may disrupt communication with the suspected or convicted device. In some implementations, communication is restricted to a gateway and the threat management facility 100 or another server that can provide remediation.

Figure 7:
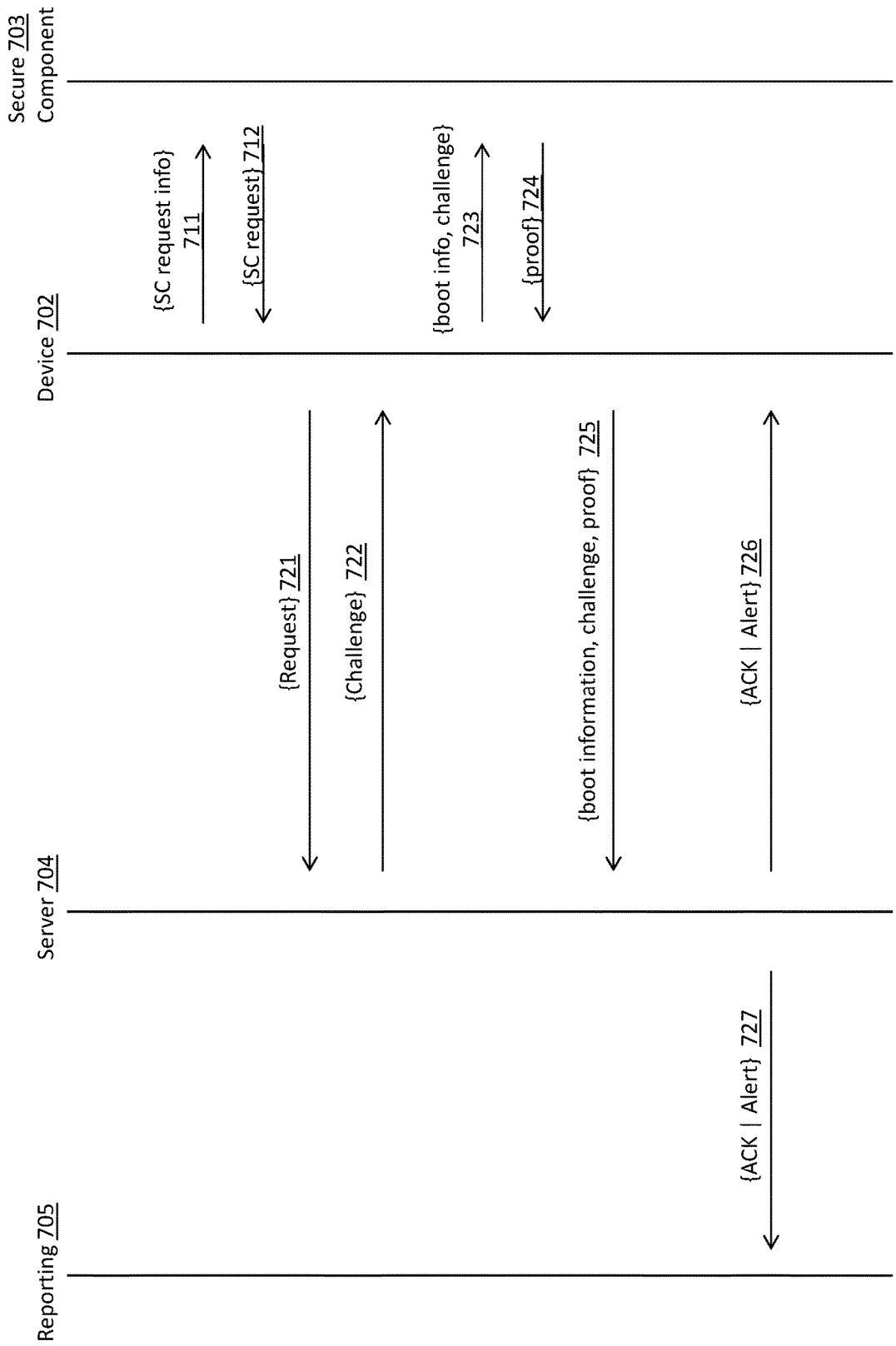
FIG. 7 illustrates communication in an implementation.

Referring to FIG. 7, in an exemplary implementation, communication between a device 702, a secure component 703 of the device, a server 704 and a reporting system 705 are shown. The device 702 may be a client 411-420 (FIG. 4) or server 431, 432 (FIG. 4) or one of the devices described with reference to FIG. 1 and FIG. 2. The device 702 includes a secure component 703, for example, a trusted component 300 (FIG. 3). The device 702 is in communication with a server 704, which may be a threat management facility, or may be, for example, a server such as a gateway, firewall, or cloud server.

In some implementations, the device 702 directs the secure component 703 to provide secure component (SC) request information 711. The secure component may generate a SC request 712 based on the SC request information 711 provided by the device 702. For example, the SC request information 711 may include one or more of a nonce, date/time information, and a device identifier. The secure component 703 may provide a hash and/or a digital signature based on some or all of the SC request information 711 provided by the device 702. The secure component 703 may include, for example, a device identifier of the device 702 or the secure component 703 in the SC request 712. The secure component 703 may include device register information in the SC request 712. The secure component 703 may include one or more proofs as part of the SC request 712.

The device 702 sends a request 721 generated by the device 702, portions or all of the SC request 712 generated by the secure component 703, or a combination, to the server 704. The request 721 may be sent at the time that the device 702 initiates operation. The request 721 may be sent at a time that the device 702 is connected to a network. The request 721 may be sent upon a predetermined schedule or a randomly chosen schedule. The request 721 may be sent based on an event, such as a detected change in the device 702. The request 721 may be sent based on a user request. The request 721 may include a device identifier. The request 721 may time or date information. The request 721 may include information encrypted with a public key of the server 704 or another device. The request 721 may include information encrypted or signed with information of the secure component 703. In this case, there may be additional communication between the device 702 and the secure component 703 in which the secure component 703 provides data that is used in the request.

In response to the request 721, the server 704 sends a challenge 722. The challenge may be used to prevent replay attacks. The challenge may include a nonce (e.g., random number). The challenge may include time information. The challenge may include other information, such as a challenge number, a public key, a certificate, an encryption key encrypted with a key of the secure component 703.

The device provides boot information 723 and the challenge to the secure component 703. The secure component may receive the boot information as part of a boot process in which trusted processes are measured and may measure other trusted processes to generate a list of boot items and associated proofs. The proofs may be recorded during the boot process by the secure component in one or more registers (e.g., platform configuration registers 306 (FIG. 3)).

In response to the boot information and the challenge, the secure component 703 generates a proof 724. The proof may be one or more signatures on one or more one-way functions computed on one or more boot items and one or more other proofs. The proof 724 may be included in or with a set of boot information for verification by a verifier.

The device 702 sends a set of boot information, including or with the proof. For example, the server may send the boot information, all or a portion of the challenge 722, and the proof 724 based on the boot information and the challenge. With this information, the server 704 may verify the proof and the challenge, and evaluate the boot information. For example, the server 704 may compare the boot information with previous boot information from the device. For example, the server 704 may identify differences in the boot information and determine whether the differences are permitted. For example, the server 704 may evaluate the reputation of boot items listed in the boot information.

For example, the server 704 may evaluate the reputation of one of the boot items. The server 704 may determine whether the one of the boot items is consistent with other boot items reported from other devices. The server 704 may determine whether the one of the boot items is consistent with a pattern of changes that is indicative of a manufacturer's update. The server 704 may determine whether the one of the boot items is consistent indicative of compromise.

From the perspective of the device 702, a processor on a device 702 may transmit request information 711 to a secure component. The secure component may receive the request information 711, process the request information, and in response provide a cryptographic proof 712 associated with all or a portion of the request information 711 to the device processor. For example, the proof may be based on all or a portion of the request information, or the proof may be based on other information provided by the device. The proof may be based on other information available to the secure component. The device may send the request to a server 721. In response to the request, the device may receive a challenge 722.

In some implementations a challenge 722 is not requested from a server 721. In some implementations, a challenge 722 is generated by the device 702. In some implementations, a challenge 722 is generated based on a date/time. In some implementations, a challenge 722 is generated by the device 702 based on other information. In some implementations, a challenge is periodically broadcast to multiple devices.

In some implementations, the processor on the device 702 may transmit the challenge 723 to the secure component. The device processor may provide boot information to the secure component 723. In response, the secure component 703 may generate a proof 724 based on all or a portion of the boot information and the challenge 723. The secure component 703 may send the proof 724 to the processor of the device 702. The device 702 may transmit all or a portion of the boot information, the challenge, and the proof to the server 725. In response, the device 702 may receive an acknowledgement 726. In response, the device may receive an alert message 726, for example, an alert message indicative of compromise. The alert message may be indicative of changes to the boot information that are not permitted. The alert message may be indicative of a reputation of boot items.

In some implementations, the boot information 723 is collected by the secure component 703 during the initial operation of the device. In some implementations, the boot information 723 is collected by the processor as part of initial operation of the device 702. In some implementations all or a portion of the proof 724 is generated during initial operations, as a list of boot items and associated proofs are generated.

In some implementations, a challenge is not used, and a date/time is included in the proof instead of the challenge. In such implementations, the request and challenge 711, 712, 721, 722 are not needed.

Referring to FIG. 8, a set of boot information such as that depicted as the exemplary set of boot information 801 may be provided by a device to permit review and verification of boot items.

It should be understood that the set of boot information 801 depicted is a simplified example, and a set of boot information would depend on many factors, including hardware, software, and configuration. A set of boot information 801 may be stored or communicated in any suitable format, encoding, or language. A set of boot information 801 may be stored, for example, in XML or in a binary format, and may use or include, for example, additional information or less information than that shown.

The set of boot information 801 may include a list of boot items 802. Boot items 811-826 in the list of boot items 802 may include any data or code that affects how a system operates prior to the loading of an operating system. A given list of boot items 802 may include a fewer number of boot items 811-826, for example, or may include many more boot items 802. A list of boot items 802 may include less information, additional information, or different information for each boot item in the list of boot items 802.

In this example, the first boot item 811 is "\Boot\winmgr.exe," the second boot item 812 is "\Boot\winload.exe," the third boot item 813 is "\Boot\drivers\MT0.dll.mui," the fourth boot item 814 is "\Boot\msrpc.sys" and the fifth boot item 815 is "\Boot\vdrvroot.sys." Again, both the format and example boot items 802 are intended to be exemplary, and the number, type, and data for the boot items 811-826 will depend on the device to which the list of boot items 802 pertains.

Each of the boot items 811-826 in the list of boot items 802 may have an associated proof 803. The proof 803, shown as hash1-hash11, may be the result of a one-way function (e.g., SHA-1) calculated on a binary representation of the associated boot item 811-826. The proof 803 may be calculated by a trusted component, for example, or may be calculated by each executable boot item 811-815 in the list of boot items. For example, each executable boot item 811-815 may calculate a proof for the next boot item in the list of boot items 802. The format of the proofs 803 are demonstrative, and the actual values will depend on the applicable boot items and the one-way function implemented. For example, the proof values hash1-hash11 may be 64 bit values, 128-bit values 256-bit values, 512-bit values, 1024-bit values, 2048-bit values, etc.

In this example, the first proof value <hash1> may be calculated by the root core of trust on the first boot item 811 "\Boot\winmgr.exe." The second auth value <hash2> may be calculated by the first boot item 811 \Boot\winmgr.exe on the second boot item \Boot\winload.exe. In this way, a proof 803 is calculated on each boot item 802.

The set of boot information 801 may include a list of ROM entries 820, such as BIOS Components 821, 822, Option ROMs 823, 824, motherboard ROMs 825, 826, etc. It should be understood that ROM entries 820 are not limited to any particular may include any code or data that is included on PROMs or any other storage that may be accessed in the initial operation of a device. The ROM entries 820 may have some overlap with boot items 802. For example, code from the ROM entries 820 may provide one or more boot items 802. ROM entries 820 may also include configuration information and data. ROM entries 820 may include code that is not ordinarily executed by boot items 802, but may be used by malware or an attacker. Each of the items in the ROM entries 820 may have an associated proof, shown as hash6-hash11. The proof may be used to evaluate whether the ROM entries 820 have changed. A hash hash6-hash11 may be compared to previous values from this device, and may be compared to hash values for that ROM Entry for other devices. For example, the hash values for a ROM Entry may be compared to that ROM entry on devices that report the same hardware manufacturer, release date, and version. The hashes hash6-hash11 on the ROM entries

820 may be calculated by the root of trust, by one of the trusted programs, or by code in one of the ROM entries, such as BIOS Component 821.

The set of boot information 801 may include hinting information 831. The hinting information 831 may include hardware or software platform information. For example, the hinting information 831 may include a hardware manufacturer 832, a hardware release date 833, and a hardware version 834 (e.g., major version, minor version). For example, the hinting information 831 may include an operating system identifier 835, an operating system release date 836 and an operating system version number 837 (e.g., major version, minor version). The hinting information 831 may include other information about hardware devices (e.g., hardware components, peripherals, temporary storage devices, software devices, device drivers, etc.). The hinting information 831 may be obtained from other parts of a hardware system, and so may be subject to manipulation by an attacker. Even so, the hinting information may be useful for having the device commit to platform information that may be used to assign reputation information.

An attestation 840 may be included in the set of boot information 801 or may be associated with the set of boot information 801. As shown, the attestation 840 includes a Device ID 841, a PCR Register value 842, 843 and a proof 844, which in this case is a digital signature. It should be understood that the format of the attestation 840 is exemplary, and that any suitable attestation may be used. For example, an attestation may take any suitable format, and may include less, additional, or different information than that shown.

In some implementations, during boot, a proof 803 is calculated on each boot item 811-815 and recorded in the list of boot items 802. A proof 803 for each boot item 811-815 also may be extended into a PCR Register, in this example, PCR Register 1 842. The proof 803 may be extended in to a PCR Register, for example, using an extend operation. Thus, the value in PCR Register 1 842 as shown in the attestation 840 is determined based on the proofs 803 of each of the boot items 811-815. A verifier reviewing the list of boot items may be able to simulate the extend operation and confirm that the PCR 1 Register value is consistent with the proofs 803.

The attestation may include a proof of some or all of the set of boot information 801 and the Device ID 841, and PCR Register 1 842 and PCR Register 2 843. The proof may be a signature 844. The signature 844 may be based on, for example, the boot items 802, proofs 803, Device ID 841, PCR Register 1 842 and PCR Register 2 value 843. The signature 844 may be based on a key, such as an attestation identity key.

A verifier reviewing the set of boot information 801 may determine that the proof 844 in the attestation 840 is consistent with the elements of the list of boot items 802 and associated proofs 803 and with the public key of the key pair that was used to generate the signature (e.g., AIK). A verifier reviewing the set of boot information 801 may determine whether each of the boot items 802 has a proof 803 that is consistent with known proof values of the boot items. A verifier reviewing the list of boot items 802 may determine whether each of the boot items 811-815 in the list of boot items 802 has associated proofs 803 that are consistent with other devices of the same type or manufacturer.

A verifier reviewing the set of boot information 801 may determine the reputation of the boot items 811-815 in the list of boot items 802. A verifier reviewing the list of boot items 802 may determine whether any of the boot items 811-815 are associated with compromised or suspected devices. A verifier reviewing the list of boot items 802 may determine whether differences between a first set of boot information and a second set of boot information are consistent with a permitted update to the device. An alert may be generated upon determining that the differences are not consistent with a permitted update to the first device. An alert may be generated if one or more of the boot items 811-815 listed in the list of boot items 802 are not consistent with sets of boot information associated with other devices having the same device type.

The above systems, devices, methods, processes, and the like may be realized in hardware, software, or any combination of these suitable for a particular application. The hardware may include a general-purpose computer and/or dedicated computing device. This includes realization in one or more microprocessors, microcontrollers, embedded microcontrollers, programmable digital signal processors or other programmable devices or processing circuitry, along with internal and/or external memory. This may also, or instead, include one or more application specific integrated circuits, programmable gate arrays, programmable array logic components, or any other device or devices that may be configured to process electronic signals. It will further be appreciated that a realization of the processes or devices described above may include computer-executable code created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software. In another aspect, the methods may be embodied in systems that perform the steps thereof, and may be distributed across devices in a number of ways. At the same time, processing may be distributed across devices such as the various systems described above, or all of the functionality may be integrated into a dedicated, standalone device or other hardware. In another aspect, means for performing the steps associated with the processes described above may include any of the hardware and/or software described above. All such permutations and combinations are intended to fall within the scope of the present disclosure.

Embodiments disclosed herein may include computer program products comprising computer-executable code or computer-usable code that, when executing on one or more computing devices, performs any and/or all of the steps thereof. The code may be stored in a non-transitory fashion in a computer memory, which may be a memory from which the program executes (such as random access memory associated with a processor), or a storage device such as a disk drive, flash memory or any other optical, electromagnetic, magnetic, infrared or other device or combination of devices. In another aspect, any of the systems and methods described above may be embodied in any suitable transmission or propagation medium carrying computer-executable code and/or any inputs or outputs from same.

It will be appreciated that the devices, systems, and methods described above are set forth by way of example and not of limitation. Absent an explicit indication to the contrary, the disclosed steps may be modified, supplemented, omitted, and/or re-ordered without departing from the scope of this disclosure. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context.

The method steps of the implementations described herein are intended to include any suitable method of causing such method steps to be performed, consistent with the patentability of the following claims, unless a different meaning is expressly provided or otherwise clear from the context. So for example performing the step of X includes any suitable method for causing another party such as a remote user, a remote processing resource (e.g., a server or cloud computer) or a machine to perform the step of X. Similarly, performing steps X, Y and Z may include any method of directing or controlling any combination of such other individuals or resources to perform steps X, Y and Z to obtain the benefit of such steps. Thus method steps of the implementations described herein are intended to include any suitable method of causing one or more other parties or entities to perform the steps, consistent with the patentability of the following claims, unless a different meaning is expressly provided or otherwise clear from the context. Such parties or entities need not be under the direction or control of any other party or entity, and need not be located within a particular jurisdiction.

It will be appreciated that the methods and systems described above are set forth by way of example and not of limitation. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context. Thus, while particular embodiments have been shown and described, it will be apparent to those skilled in the art that various changes and modifications in form and details may be made therein without departing from the spirit and scope of this disclosure and are intended to form a part of the invention as defined by the following claims, which are to be interpreted in the broadest sense allowable by law.

What is claimed is:

1. A system, comprising:
   a processor; and
   a non-transitory computer readable medium comprising instructions that when executed on the processor cause the processor to perform steps comprising:
   receive a first request from a device;
   in response to the first request, send a first challenge to the device, the first challenge including time information;
   in response to the first challenge, receive from the device a first set of boot information and a first cryptographic proof based on at least the time information of the first challenge, wherein the first set of boot information is generated by a trusted component of the device;
   verify the first cryptographic proof of the first challenge and the first set of boot information;
   store the first set of boot information;
   receive a second request from the device;
   send a second challenge to the device;
   in response to the second challenge, receive from the device a second set of boot information and a second cryptographic proof of the second challenge, wherein the second set of boot information is generated by the trusted component of the device, the second set of boot information includes information for at least one boot item identified in the first set of boot information, and the second set of boot information corresponds to a different time than the first set of boot information;
   verify the second cryptographic proof of the second challenge and the second set of boot information;
   compare the first set of boot information and the second set of boot information;
   upon determining that the first set of boot information and the second set of boot information are different, determine whether differences between the first set of boot information and the second set of boot information are permitted as consistent with a pattern for a permitted update to the device by a hardware manufacturer; and
   generate an alert upon determining that differences between the first set of boot information and the second set of boot information are not permitted.

2. A method for securing a device, comprising:
   receiving a first set of boot information of the device;
   receiving a first cryptographic proof of the first set of boot information, the first cryptographic proof based on at least time information of a challenge to the device;
   receiving a second set of boot information of the device, wherein the second set of boot information includes information for at least one boot item identified in the first set of boot information, and the second set of boot information corresponds to a different time than the first set of boot information;
   receiving a second cryptographic proof of the second set of boot information;
   comparing the first set of boot information and the second set of boot information;
   upon determining that the first set of boot information and the second set of boot information are different, determining whether differences between the first set of boot information and the second set of boot information are permitted as consistent with a pattern for a permitted update to the device by a hardware manufacturer; and
   generating an alert upon determining that differences between the first set of boot information and the second set of boot information are not permitted.

3. The method of claim 2, wherein determining whether differences between the first set of boot information and the second set of boot information are permitted further comprises comparing first boot items identified in the first set of boot information with second boot items identified in the second set of boot information.

4. The method of claim 2, wherein the first set of boot information further comprises cryptographic proofs of each boot item identified in the first set of boot information.

5. The method of claim 2, wherein the first set of boot information and the second set of boot information each comprise one or more platform configuration register values.

6. The method of claim 2, wherein the first set of boot information and the second set of boot information each comprise a device identifier.

7. The method of claim 2, wherein the first set of boot information and the second set of boot information each comprise device platform information.

8. The method of claim 2, wherein the first set of boot information includes information about boot items and configuration values.

9. The method of claim 2, wherein determining whether differences between the first set of boot information and the second set of boot information are permitted comprises comparing versions of changed boot items.

10. The method of claim 2, wherein determining whether differences between the first set of boot information and the second set of boot information are permitted comprises determining a type of boot item that changed.

11. The method of claim 2, wherein the first cryptographic proof and the second cryptographic proof are generated by a trusted component of the device.

12. A computer program product comprising a non-transitory computer readable medium having stored thereon computer executable code that, when executing on a threat management facility, performs steps comprising:
receive a first set of boot information from a device;
receive a first cryptographic proof of the first set of boot information, the first cryptographic proof based on at least time information of a challenge to the device;
receive a second set of boot information from the device, wherein the second set of boot information includes information for at least one boot item identified in the first set of boot information, and the second set of boot information corresponds to a different time than the first set of boot information;
receive a second cryptographic proof of the second set of boot information;
compare the first set of boot information and the second set of boot information;
upon determining that the first set of boot information and the second set of boot information are different, determine whether differences between the first set of boot information and the second set of boot information are permitted as consistent with a pattern for a permitted update to the device by a hardware manufacturer; and
generate an alert upon determining that differences between the first set of boot information and the second set of boot information are not permitted.

13. The computer program product of claim 12, wherein the first set of boot information further comprises cryptographic proofs of each boot item identified in the first set of boot information.

14. The computer program product of claim 12, wherein the first set of boot information and the second set of boot information each comprise one or more platform configuration register values.

15. The computer program product of claim 12, wherein the first set of boot information and the second set of boot information each comprise a device identifier.

16. The computer program product of claim 12, wherein the first set of boot information and the second set of boot information each comprise device platform information.

17. The computer program product of claim 12, wherein the first set of boot information includes information about boot items and configuration values.

18. The computer program product of claim 12, wherein determining whether differences between the first set of boot information and the second set of boot information are permitted comprises comparing versions of changed boot items.

19. The computer program product of claim 12, wherein determining whether differences between the first set of boot information and the second set of boot information are permitted comprises determining a type of boot item that changed.

* * * * *